(12) United States Patent
Sato et al.

(10) Patent No.: US 12,072,514 B2
(45) Date of Patent: Aug. 27, 2024

(54) OPTICAL ELEMENT AND LIGHT DEFLECTION DEVICE

(71) Applicant: FUJIFILM Corporation, Tokyo (JP)

(72) Inventors: Hiroshi Sato, Kanagawa (JP); Yukito Saitoh, Kanagawa (JP); Katsumi Sasata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 676 days.

(21) Appl. No.: 17/212,351

(22) Filed: Mar. 25, 2021

(65) Prior Publication Data

US 2021/0208316 A1    Jul. 8, 2021

Related U.S. Application Data

(63) Continuation of application No. PCT/JP2019/033565, filed on Aug. 27, 2019.

(30) Foreign Application Priority Data

Sep. 28, 2018 (JP) ................................. 2018-185584

(51) Int. Cl.
  *G02B 5/02* (2006.01)
  *G02B 5/30* (2006.01)
(52) U.S. Cl.
  CPC ......... *G02B 5/0257* (2013.01); *G02B 5/3016* (2013.01)
(58) Field of Classification Search
  CPC .. G02B 5/0257; G02B 5/3016; G02B 5/1838; G02B 5/1833; G02B 5/3083;
  (Continued)

(56) References Cited

U.S. PATENT DOCUMENTS

| 5,093,749 A | 3/1992 | Maeda |
| 2010/0225876 A1 | 9/2010 | Escuti et al. |

(Continued)

FOREIGN PATENT DOCUMENTS

| CN | 107615165 A | 1/2018 |
| JP | 3-213802 A | 9/1991 |

(Continued)

OTHER PUBLICATIONS

Japanese Notice of Reasons for Refusal for corresponding Japanese Application No. 2020-548216, dated Oct. 5, 2021, with an English translation.

(Continued)

*Primary Examiner* — Stephone B Allen
*Assistant Examiner* — Jyotsna V Dabbi
(74) *Attorney, Agent, or Firm* — Birch, Stewart, Kolasch & Birch, LLP

(57) ABSTRACT

Provided are an optical element, including a plurality of optically anisotropic layers, each of which has an in-plane alignment pattern in which orientations of optical axes derived from a liquid crystal compound change continuously and rotationally along at least one in-plane direction, in a thickness direction, in which the optically anisotropic layers each have regions where lengths over which the orientations of the optical axes rotate by 180° in the one direction are different from each other, and at least one of the plurality of optically anisotropic layers is an inclined optically anisotropic layer having a region where a plurality of pairs of bright lines and dark lines in a cross-sectional image are present and the pairs of the bright lines and the dark lines are inclined at inclination angles which are different from each other with respect to a normal line of an interface of the optically anisotropic layer.

13 Claims, 8 Drawing Sheets

(58) Field of Classification Search
CPC .......... G02B 5/0252; G02B 5/08; G02B 5/10;
G02B 5/0055; G02B 5/32; G02B 27/286;
G02B 27/283; G02F 1/13718; G02F
1/137; G02F 1/1396; G02F 1/133757;
G02F 1/1335; G02F 1/1337
USPC .......................................................... 359/599
See application file for complete search history.

(56) References Cited

U.S. PATENT DOCUMENTS

| | | |
|---|---|---|
| 2010/0231847 A1 | 9/2010 | Escuti |
| 2012/0242918 A1 | 9/2012 | Valyukh et al. |
| 2013/0027656 A1 | 1/2013 | Escuti et al. |
| 2013/0077040 A1 | 3/2013 | Escuti et al. |
| 2015/0205182 A1 | 7/2015 | Leister |
| 2016/0011353 A1 | 1/2016 | Escuti et al. |
| 2018/0052264 A1 | 2/2018 | Saitoh et al. |
| 2018/0143438 A1* | 5/2018 | Oh ....................... G02B 6/0056 |
| 2018/0164480 A1 | 8/2018 | Yoshida |
| 2019/0383909 A1 | 12/2019 | Schnitzer et al. |

FOREIGN PATENT DOCUMENTS

| | | |
|---|---|---|
| JP | 2002-357804 A | 12/2002 |
| JP | 2010-525394 A | 7/2010 |
| JP | 2014-16632 A | 1/2014 |
| JP | 2014-528597 A | 10/2014 |
| JP | 2016-519327 A | 6/2016 |
| WO | WO 2016/194961 A1 | 12/2016 |
| WO | WO 2017/030176 A1 | 2/2017 |
| WO | WO 2018/094096 A1 | 5/2018 |
| WO | WO 2018/149704 A1 | 8/2018 |

OTHER PUBLICATIONS

Japanese Office Action for Japanese Application No. 2020-548216, dated May 10, 2022, with English translation.
Chinese Office Action and Search Report for corresponding Chinese Application No. 201980063397.X, dated Jun. 15, 2022, with an English translation.
International Preliminary Report on Patentability and Written Opinion of the International Searching Authority (Forms PCT/IB/326, PCT/IB/373 and PCT/ISA/237) for corresponding International Application No. PCT/JP2019/033565, dated Apr. 8, 2021, with English translation.
International Search Report (Form PCT/ISA/210) for corresponding International Application No. PCT/JP2019/033565, dated Nov. 12, 2019, with English translation.
Japanese Office Action for corresponding Japanese Application No. 2020-548216, dated Aug. 30, 2023, with English translation.
Japanese Office Action for corresponding Japanese Application No. 2020-548216, dated Feb. 15, 2024, with an English translation.

* cited by examiner

OPTICAL ELEMENT AND LIGHT DEFLECTION DEVICE

CROSS-REFERENCE TO RELATED APPLICATIONS

This application is a continuation application of International Application No. PCT/JP2019/033565, filed Aug. 27, 2019, the disclosure of which is incorporated herein by reference in its entirety. Further, this application claims priority from Japanese Patent Application No. 2018-185584, filed Sep. 28, 2018, the disclosure of which is incorporated herein by reference in its entirety.

BACKGROUND OF THE INVENTION

1. Field of the Invention

The present disclosure relates to an optical element and a light deflection device comprising the optical element.

2. Description of the Related Art

Since polarized light has been used in various optical devices or systems, development of an optical element for controlling reflection, condensing, and divergence of polarized light has been promoted.

JP2014-016632A and JP2010-525394A disclose a polarization diffraction element formed by pattern-aligning a liquid crystal compound having an optical anisotropy.

Further, JP2016-519327A discloses a polarization conversion system formed of a geometric phase element which has a local optical axis direction that nonlinearly changes in at least one dimension along the surface and has an optical anisotropy. Here, pattern alignment of a liquid crystal compound is also used.

SUMMARY OF THE INVENTION

In JP2014-016632A and JP2010-525394A, there is no description for a technique of emitting light in directions at different diffraction angles depending on the incident position.

As a result of examination conducted by the present inventors, it was clarified that in a case where light is allowed to be incident on the layer which has a local optical axis direction that nonlinearly changes in one dimension and has an optical anisotropy as described in JP2016-519327A, the degree of diffraction varies depending on the incident position. In such an element, in a case where light is incident at different incidence angles depending on the region and emitted, the in-plane diffraction efficiency varies depending on the region, and thus a region where the diffraction efficiency decreases is generated in some cases.

The present disclosure has been made in consideration of the above-described circumstances, and an object thereof is to provide an optical element and a light deflection device, in which in-plane diffraction efficiency is averaged and the average diffraction efficiency is improved.

The technique of the present disclosure includes the following aspects.

<1> An optical element comprising: a plurality of optically anisotropic layers, each of which has an in-plane alignment pattern in which orientations of optical axes derived from a liquid crystal compound change continuously and rotationally along at least one in-plane direction, in a thickness direction, in which the optically anisotropic layers each have regions where lengths over which the orientations of the optical axes rotate by 180° in the at least one in-plane direction are different from each other, and at least one of the plurality of optically anisotropic layers is an inclined optically anisotropic layer having a region where a plurality of pairs of bright lines and dark lines derived from the orientations of the optical axes in a cross-sectional image obtained by observing a cross section cut in the thickness direction along the at least one in-plane direction using a scanning electron microscope are present and the pairs of the bright lines and the dark lines are inclined at inclination angles which are different from each other with respect to a normal line of an interface of the optically anisotropic layer.

<2> The optical element according to <1>, in which the optical element comprises two inclined optically anisotropic layers, and an inclination angle of the pairs of the bright lines and the dark lines in one inclined optically anisotropic layer is different from an inclination angle of the pairs of the bright lines and the dark lines of the other inclined optically anisotropic layer in at least some opposing regions of the two inclined optically anisotropic layers in the cross-sectional image.

<3> The optical element according to <1> or <2>, in which the optical element comprises two inclined optically anisotropic layers, and an inclination direction of the pairs of the bright lines and the dark lines in one inclined optically anisotropic layer with respect to the normal line is different from an inclination angle of the pairs of the bright lines and the dark lines of the other inclined optically anisotropic layer with respect to the normal line in at least some opposing regions of the two inclined optically anisotropic layers in the cross-sectional image.

<4> The optical element according to any one of <1> to <3>, in which the optical element comprises two inclined optically anisotropic layers, and an inclination direction of the pairs of the bright lines and the dark lines in one inclined optically anisotropic layer with respect to the normal line is the same as an inclination direction of the pairs of the bright lines and the dark lines of the other inclined optically anisotropic layer with respect to the normal line in at least some opposing regions of the two inclined optically anisotropic layers in the cross-sectional image.

<5> The optical element according to any one of <1> to <4>, in which the inclined optically anisotropic layer has a region where the optical axes are twistedly aligned in the thickness direction.

<6> The optical element according to any one of <1> to <5>, in which the optical element has a function of diffracting and transmitting an incidence ray.

<7> The optical element according to any one of <1> to <5>, in which the liquid crystal compound of the inclined optically anisotropic layers is cholesterically aligned.

<8> The optical element according to <7>, in which the optical element has a function of diffracting and reflecting an incidence ray.

<9> The optical element according to any one of <1> to <8>, in which the in-plane alignment pattern of each optically anisotropic layer is a pattern in which the lengths over which the orientations of the optical axes rotate by 180° in the one direction gradually change in the one direction.

<10> The optical element according to any one of <1> to <9>, in which the in-plane alignment pattern of each optically anisotropic layer is a pattern in which the one direction is provided radially from an inner side to an outer side.

<11> The optical element according to any one of <1> to <10>, in which the in-plane alignment pattern of each optically anisotropic layer has a region where the length over which the orientations of the optical axes rotate by 180° in the one direction is 10 µm or less.

<12> A light deflection device comprising: a light deflection element which deflects an incidence ray and emits the deflected incidence ray; a driving unit which drives the light deflection element; and the optical element according to any one of <1> to <11>, which is disposed on a light emission side of the light deflection element.

According to the present disclosure, in the optical element and the light deflection device, the in-plane diffraction efficiency is averaged and the average diffraction efficiency is improved.

DESCRIPTION OF THE PREFERRED EMBODIMENTS

Hereinafter, embodiments of an optical element according to the present invention will be described with reference to the accompanying drawings. Further, in each drawing, the scales of constituent elements are differentiated from the actual scales as appropriate in order to facilitate visual recognition. Further, a numerical range shown using "to" in the present specification indicate a range including numerical values described before and after "to" as a lower limit and an upper limit. In regard to the angles, the terms "orthogonal" and "parallel" each indicate a range of a strict angle ±10°.

[Optical Element]

Figure 1:
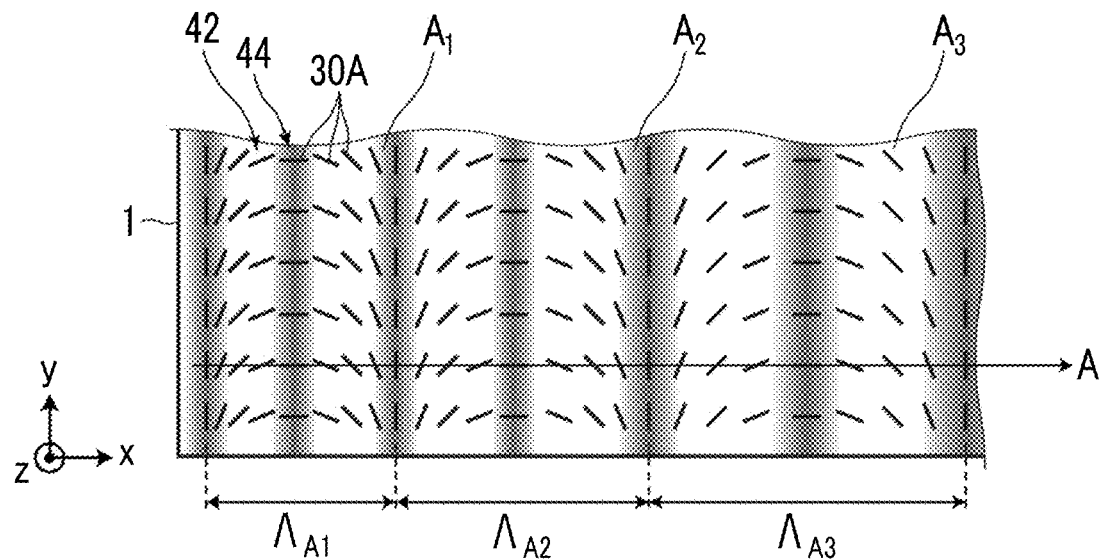
FIG. 1 is a plan view schematically illustrating an alignment pattern of optical axes on a part of a surface of an optical element according to a first embodiment.
Figure 2:
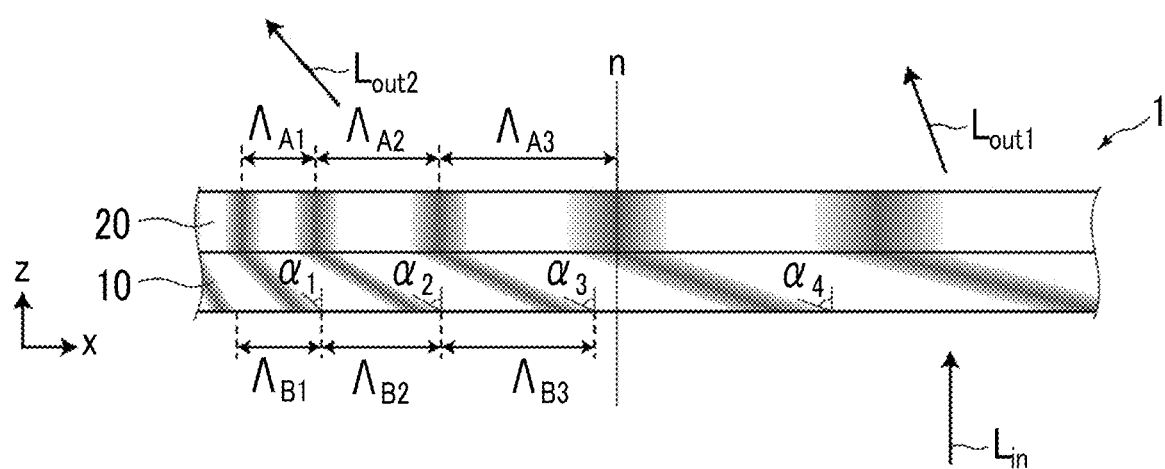
FIG. 2 is a schematic view of a cross-sectional image obtained by observing the optical element illustrated in FIG. 1 using a scanning electron microscope.

FIG. 1 is a plan view schematically illustrating a part of a surface of an optical element 1 according to a first embodiment, and FIG. 2 is a schematic view of a cross-sectional image obtained by observing the cross section of the optical element 1 using a scanning electron microscope (SEM). In the following drawings, a sheet surface of a sheet-like optical element is defined as an xy surface, and a thickness direction thereof is defined as a z direction.

The optical element 1 comprises two optically anisotropic layers 10 and 20 which are laminated in the thickness direction. The optically anisotropic layers 10 and 20 are formed of a cured layer of a composition containing a liquid crystal compound. Further, the optical element 1 may be configured such that a support and an alignment film are provided and an optically anisotropic layer is provided on the alignment film. The optical element according to the embodiment of the present disclosure may comprise a plurality of optically anisotropic layers in the thickness direction and may comprise three or more optically anisotropic layers without limiting to a two-layer structure.

The optically anisotropic layers 10 and 20 each have an in-plane alignment pattern (an in-plane liquid crystal alignment pattern) in which the orientations of the optical axes 30A derived from the liquid crystal compound change continuously and rotationally along at least one direction A. FIG. 1 schematically illustrates the in-plane alignment pattern of the optical axes 30A derived from the liquid crystal compound on the surface of the optically anisotropic layer 20.

The optical axis 30A derived from the liquid crystal compound is in a long axis direction (slow axis) in a rod shape in a case where a rod-like liquid crystal compound is used and is in a direction (fast axis) perpendicular to a disk surface in a case where a disk-like liquid crystal compound is used. In the description below, the optical axis 30A derived from the liquid crystal compound is also referred to as the optical axis 30A of the liquid crystal compound or simply referred to as the optical axis 30A.

The in-plane alignment pattern in which the orientations of the optical axes 30A change continuously and rotationally in one direction A is a pattern in which the optical axes 30A are aligned and fixed such that the angles between the optical axes A of the liquid crystal compound, which are arranged along one direction A (hereinafter, also referred to as an axis A), and the axis A vary depending on the position of the axis A direction, and the angles between the optical axes 30A and the axis A gradually change from φ to φ+180° or φ−180° along the axis A. Hereinafter, in the optically anisotropic layer as illustrated in FIGS. 1, an in-plane alignment pattern, in which optical axes are arranged such that the orientations of the optical axes change continuously and rotationally in one direction among a plurality of local regions (unit regions) arranged in one direction, where optical axes of the liquid crystal compound are parallel to the surface of the optically anisotropic layer and the orientations of the optical axes are constant, is referred to as a horizontal rotational alignment pattern.

Further, the expression "the angles between the optical axes 30A and the axis A gradually change" indicates that the orientations of the optical axes may change by a predetermined angle among the unit regions, may change at an interval of a non-uniform angle instead of an interval of a constant angle or may change continuously. However, a difference between the angles of the optical axes 30A between the unit regions adjacent to each other in the X direction is preferably 450 or less, more preferably 150 or less, and still more preferably a smaller angle.

In the optical element 1, in such a horizontal rotational alignment pattern of the liquid crystal compound 30, the length (distance) at which the optical axis 30A of the liquid crystal compound 30 rotates by 180° is defined as a length A of one period in the horizontal rotational alignment. That is, the length of one period in the horizontal rotational alignment pattern is the distance at which the angle between the optical axis 30A of the liquid crystal compound 30 and the axis A changes from $\varphi$ to $\varphi+180°$. In the description below, the length A of this one period is also referred to as "one period A" or simply referred to as the "period A".

The optically anisotropic layers 10 and 20 in the optical element 1 each have regions where the lengths A of one period in the axis A direction are different from each other. In the example illustrated in FIG. 1, the optically anisotropic layer has regions $A_1$, $A_2$, $A_3$, . . . where the lengths of one period in the axis A direction are $\Lambda_{A1}$, $\Lambda_{A2}$, $\Lambda_{A3}$ . . . . (Here, $\Lambda_{A1}<\Lambda_{A2}<\Lambda_{A3}$) which are different from each another. In the present example, the optically anisotropic layer has a liquid crystal alignment pattern in which the period gradually shortens from the right to the left of the paper surface, but the optical element of the present disclosure may have two or more regions where the lengths of one period are different from each another. However, in a case of application to a light deflection device described below, a liquid crystal alignment pattern in which the length of one period gradually changes is preferable as described in the present example. It is preferable that the optically anisotropic layer has a region where the period A is 10 µm or less.

In the plurality of optically anisotropic layers, the lengths of one period in the opposing regions may be different, but it is preferable that the lengths thereof are made to match each other within a range of ±10%.

In such a configuration, the periods can be made to match each other by forming the plurality of optically anisotropic layers in order of the first optically anisotropic layer, the second optically anisotropic layer thereon through coating or the like, and the subsequent optically anisotropic layers.

As illustrated in FIG. 1, in a case where the optical element 1 is observed with an optical microscope in a state where the optical element 1 comprising the optically anisotropic layers is interposed between two polarizers orthogonal to the alignment pattern of the optical axes, bright portions 42 and dark portions 44 are observed alternately. A bright and dark period (that is, a period of a bright portion or a period of a dark portion) is half the period A of the horizontal rotational alignment pattern of the optical axes.

At least one layer of the two optically anisotropic layers 10 and 20, that is, the first optically anisotropic layer 10 in the present example is an inclined optically anisotropic layer. Hereinafter, the first optically anisotropic layer is also referred to as an inclined optically anisotropic layer 10. Here, the inclined optically anisotropic layer is a layer having a region where a plurality of pairs of bright lines and dark lines derived from the orientations of the optical axes in a cross-sectional image (hereinafter, also referred to as a cross-sectional SEM image) obtained by observing a cross section cut in the thickness direction along one direction using a scanning electron microscope (SEM) are present along the one direction and the pairs of the bright lines and the dark lines are inclined at different inclination angles with respect to a normal line n of an interface of the optically anisotropic layer. The expression "bright lines and dark lines derived from the orientations of the optical axes" indicates bright and dark lines observed according to the alignment state of the liquid crystal compound of the optically anisotropic layer in the thickness direction.

FIG. 2 is a schematic view of a cross-sectional image in a case where a cross section cut in the thickness direction along one direction in which the optical axes rotate is observed by an SEM. As illustrated in FIG. 2, a plurality of pairs of bright lines and dark lines inclined obliquely with respect to the normal line n of the interface of the inclined optically anisotropic layer 10 are alternately present in the cross-sectional image.

The inclination of the bright and dark lines with respect to the normal line n of the interface varies depending on the position of the x direction, and in the present example, the inclination angles gradually increase in an x-axis direction ($\alpha_1<\alpha_2<\alpha_3$ . . . ). Here, the inclination angle of the bright and dark lines is defined as an acute angle smaller than 900 among angles between the bright and dark lines and the normal line n.

In a case where the inclined optically anisotropic layer 10 has, for example, twisted alignment in the thickness direction in addition to the horizontal rotational alignment, bright and dark lines are observed in the above-described cross-sectional image.

Figure 3:
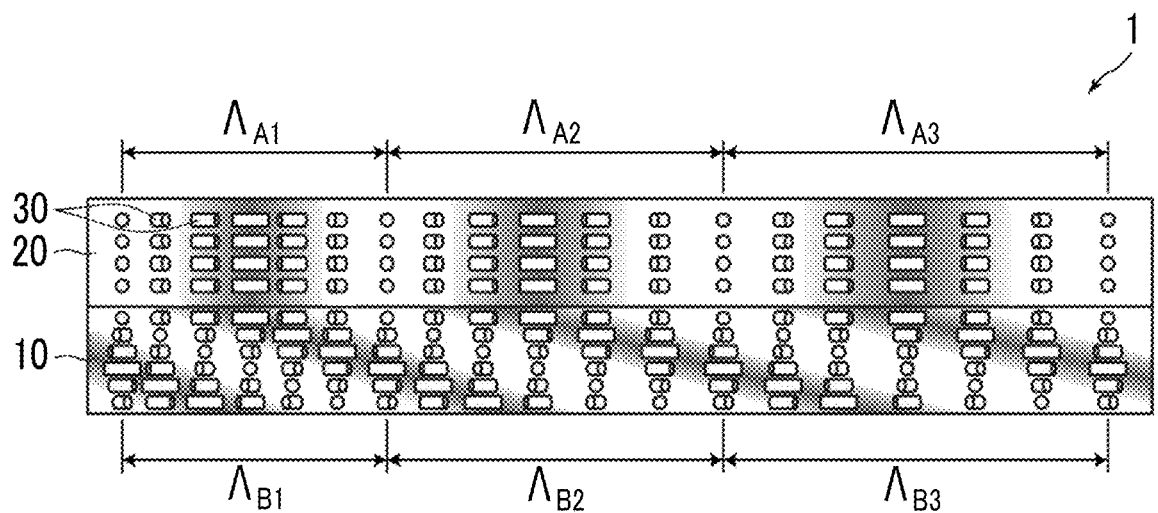
FIG. 3 is a view schematically illustrating a liquid crystal alignment pattern of the optical element illustrated in FIG. 1 in a thickness direction (z direction) and a horizontal direction (x direction).

FIG. 3 schematically illustrates the liquid crystal alignment pattern in the cross section of the optical element 1 illustrated in FIGS. 1 and 2. Here, the liquid crystal compound is the rod-like liquid crystal compound 30. In FIG. 3, the bright and dark lines observed in a case where the cross section is observed by an SEM are shown to be superimposed.

As illustrated in FIG. 3, the inclined optically anisotropic layer 10 has a liquid crystal alignment pattern in which the rod-like liquid crystal compound 30 (hereinafter, simply referred to as the liquid crystal compound 30) is horizontally rotationally aligned in the x direction and twistedly aligned in the thickness direction.

The expression "the optical axes are twistedly aligned in the thickness direction" indicates a state in which the orientations of the optical axes arranged in the thickness direction from one surface to the other surface of the optically anisotropic layer 10 change relatively so that the optical axes are twistedly aligned in one direction and fixed. The twist property is classified into a right twist property and a left twist property and may be applied according to the direction of light intended to be diffracted. Further, the twist of the optical axis in the thickness direction is less than one rotation, that is, the twist angle is less than 360°. For example, in the example of FIG. 3, the optical axes of the liquid crystal compound 30 rotate by approximately 1400 from one surface side to the other surface side in the thickness direction (z direction). The twist angle of the liquid crystal compound 30 in the thickness direction is preferably in a range of 100 to 2000 and more preferably in a range of 450 to 180°. In a case of cholesteric alignment described below, the twist angle is 3600 or greater, and the optically anisotropic layer has selective reflectivity in which specific circularly polarized light in a specific wavelength range is reflected. The "twist alignment" in the present specification does not include the cholesteric alignment, and selective reflectivity does not occur in the optically anisotropic layer having the twist alignment.

In a case where the cross section of the inclined optically anisotropic layer having such a liquid crystal alignment pattern is observed by an SEM, the bright and dark lines illustrated in FIG. 2 are observed. As in a case where the bright and dark lines are shown to be superimposed in FIG. 3, the period of the bright and dark lines matches the period of the horizontal rotational alignment.

Further, in the cross-sectional image, a plurality of bright and dark lines are also alternately present in the second optically anisotropic layer 20, but the bright and dark lines of the second optically anisotropic layer 20 are along the normal line n of the interfaces of the optically anisotropic layer 20 and are not inclined. In the second optically anisotropic layer 20, the orientations of the optical axes in the thickness direction are uniform.

Further, in the present optical element 1, the periods $\Lambda_{A1}$, $\Lambda_{A2}$, . . . of the horizontal rotational alignment in the first optically anisotropic layer 10 match the periods $\Lambda_{B1}$, $\Lambda_{B2}$, . . . of the horizontal rotational alignment in the second optically anisotropic layer 20 in the opposing regions as illustrated in FIG. 2. That is, "$\Lambda_{A1}=\Lambda_{B1}, \Lambda_{A2}=\Lambda_{B2}, \ldots$" are satisfied.

The optical element 1 diffracts and transmits an incidence ray. For example, in a case where an incidence ray $L_{in}$ of predetermined circularly polarized light is incident, the incidence ray $L_{in}$ receives refractive power from the optically anisotropic layer 20, and light is emitted to the bent direction. The refractive power varies depending on the period of the horizontal rotational alignment, and a larger diffraction angle is obtained as the period shortens. In a case where the incidence ray $L_{in}$ of predetermined circularly polarized light is incident at the identical incidence angle in regions where the periods of the horizontal rotational alignment in the optically anisotropic layers 10 and 20 are different from each other, the diffraction angle of emitted light $L_{out2}$ in a region where the period is relatively small is larger than the diffraction angle of emitted light $L_{out1}$ in a region where the period is relatively large.

Here, the principle that the optically anisotropic layer having the horizontal rotational alignment pattern functions as a transmission type diffraction element will be briefly described with reference to FIG. 4.

Further, in a case where the optically anisotropic layer functions as a transmission type diffraction element, it is preferable that an in-plane retardation Re ($\lambda$) (=$\Delta n_\lambda \times d$) with respect to a wavelength $\lambda$ is in a range of $0.3\lambda$ to $0.7\lambda$. The retardation Re is preferably in a range of $0.4\lambda$ to $0.6\lambda$, more preferably in a range of $0.45\lambda$ to $0.55\lambda$, and particularly preferably $0.5\lambda$.

Further, $\Delta$na represents the birefringence of the optically anisotropic layer at a wavelength k, and d represents the thickness of the optically anisotropic layer. For example, in a case where light having a wavelength of 940 nm is assumed as an incidence ray, the retardation Re with respect to light having a wavelength of 940 nm may be in a range of 282 nm to 658 nm and particularly preferably 470 nm. In a case where the retardation Re is in the above-described range, the optically anisotropic layer exhibits a function as a typical $\lambda/2$ plate, that is, a function of providing a phase difference of 180° ($=\pi=\lambda/2$) between linear polarization components to which the incidence ray is orthogonal. Further, it is preferable that the retardation is closer to $\lambda/2$ from the viewpoint that the diffraction efficiency is improved, but the retardation is not limited to the above-described range.

In a case where the optically anisotropic layer has a retardation of approximately $\lambda/2$, a phase difference of $\lambda/2$ is imparted to the incidence ray, and the incidence ray having predetermined circularly polarized light is converted into circularly polarized light in the opposite orientation and then emitted.

Figure 4:
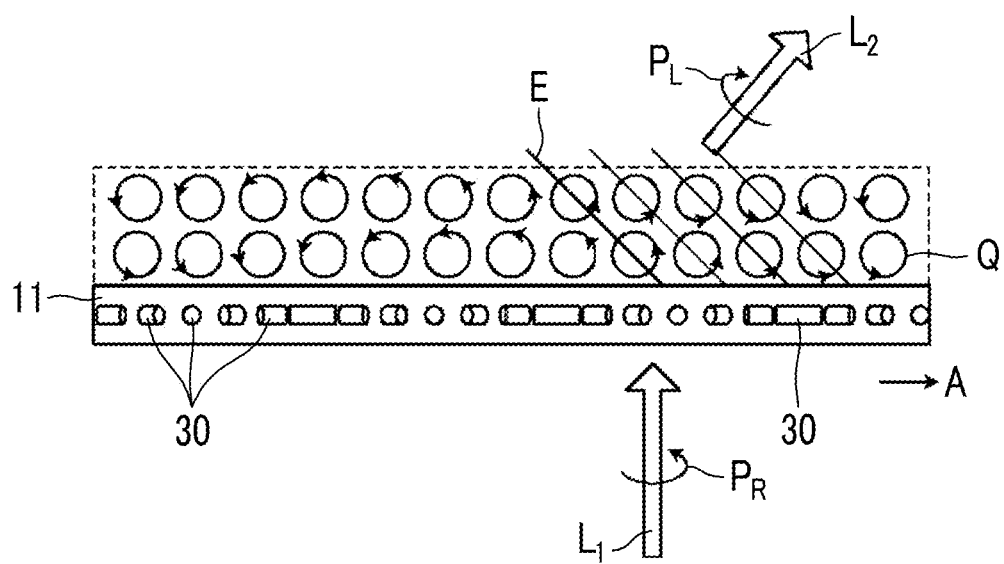
FIG. 4 is a conceptual view illustrating an action of an optically anisotropic layer having a horizontal rotational alignment pattern.

FIG. 4 conceptually illustrates the action of the optically anisotropic layer 11 having a horizontal rotational alignment pattern in a case where right circularly polarized light PR having a wavelength $\lambda$ is used as an incidence ray L1 with respect to the optically anisotropic layer 11. In a case where the incidence ray L1 of right circularly polarized light having a wavelength $\lambda$ is incident on the optically anisotropic layer 11, the incidence ray L1 that is the right circularly polarized light PR passes through the optically anisotropic layer 11 to provide a phase difference of $\lambda/2$ so that the incidence ray L1 is converted into left circularly polarized light $P_L$. Further, the absolute phase of the incidence ray L1 changes due to the optical axes 30A of the liquid crystal compound 30 in each unit region (local region) in the horizontal rotational alignment pattern. Here, since the orientations of the optical axes 30A of the liquid crystal compound 30 in the optically anisotropic layer change rotationally along the axis A, the amount of change in absolute phase varies depending on the orientations of the optical axes 30A of the liquid crystal compound 30 at the position of the axis A of the optically anisotropic layer 11 on which the incidence ray is incident. In the region indicated by the broken line in FIG. 4, a state in which the amount of change in absolute phase Q varies depending on the x coordinate is schematically illustrated.

An equiphase surface E of the absolute phase having an angle with respect to the surface of the optically anisotropic layer 11 is formed due to deviation of the absolute phase Q in a case of light passing through the optically anisotropic layer 11 as illustrated in FIG. 4. In this manner, a bending force is applied to the incidence ray L1, which has been incident in the normal direction, in a direction perpendicular to the equiphase surface E so that the traveling direction of the incidence ray L1 is changed. That is, the incidence ray L1 that is right circularly polarized light PR is converted into left circularly polarized light PL after passing through the optically anisotropic layer 11 and is emitted from the optically anisotropic layer 11 as emitted light L2 that travels in a direction forming a predetermined angle with the normal direction.

Meanwhile, in a case where left circularly polarized light is incident on the optically anisotropic layer 11 as the incidence ray, the incidence ray is converted into right circularly polarized light in the optically anisotropic layer 11 and receives a bending force in the orientation opposite to that of the figure so that the traveling direction is changed. Further, in a case where the rotation direction of the horizontal rotational alignment of the optical axes 30A of the liquid crystal compound 30 is opposite to the direction described above, the refraction direction of light due to the optically anisotropic layer is opposite to the direction described above.

Since a larger bending force can be applied to the incidence ray as one period in the in-plane alignment pattern of the optically anisotropic layer shortens, the diffraction angle can be increased.

Further, the wavelength $\lambda$ of light that allows the optically anisotropic layer 11 to generate a diffraction action may be in a range from ultraviolet to visible light and infrared and furthermore, may be at an electromagnetic wave level. For the same period, the diffraction angle increases as the wavelength of the incidence ray increases, and the diffraction angle decreases as the wavelength of the incidence ray decreases. Therefore, the period may be set according to a target wavelength and a desired diffraction angle.

Hereinbefore, the case where the bending force is applied to the light incident from the normal direction has been described, but the bending force is applied to an oblique incidence ray based on the same principle, and emitted light at an emission angle different from the incidence angle can be obtained.

Since the first and second optically anisotropic layers 10 and 20 of the optical element 1 with the present configuration have regions where the periods of the respective in-plane horizontal rotational alignment patterns are different from each other, light at different emission angles with respect to the same incidence angle can be emitted. In a case where the optical axes are not twistedly aligned in the thickness direction as in the second optically anisotropic layer 20, there is a problem in that the diffraction efficiency for light that is incident in the normal direction is high, but the diffraction efficiency for light that is incident obliquely is low. Further, in the inclined optically anisotropic layer 10, the diffraction efficiency for the oblique incidence ray can be improved.

Since the optical element 1 has a laminated structure of two or more optically anisotropic layers, and at least one layer is an inclined optically anisotropic layer, the average diffraction efficiency in a case where light is incident by changing the incidence angle depending on the region can be improved, and a difference in intensity of emitted light can be suppressed so that the emission intensity can be averaged.

The optically anisotropic layer has a two-layer structure in the present example, but may have three or more layers. Further, the optical element may have only one inclined optically anisotropic layer, but it is more preferable that the optical element comprises two or more inclined optically anisotropic layers.

Figure 5:
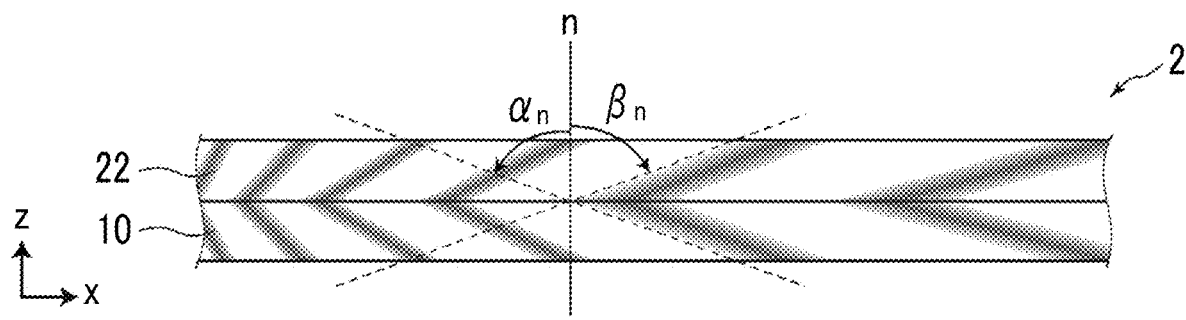
FIG. 5 is a schematic view of a cross-sectional image obtained by observing an optical element according to a second embodiment using a scanning electron microscope.
Figure 6:
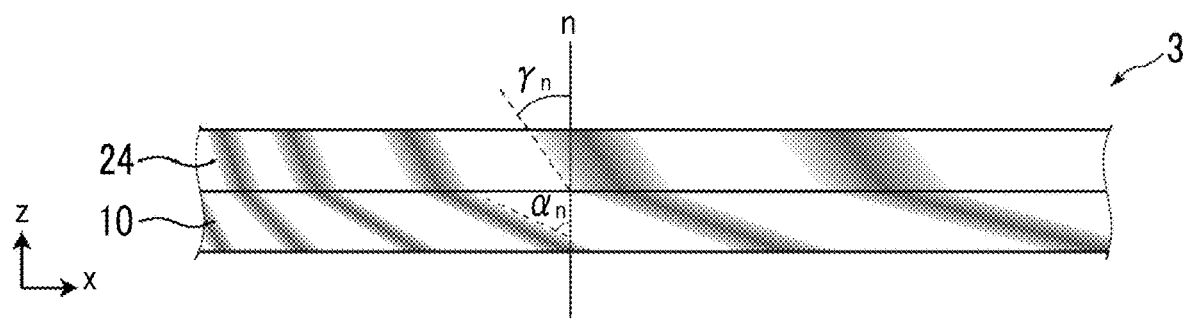
FIG. 6 is a schematic view of a cross-sectional image obtained by observing an optical element according to a third embodiment using a scanning electron microscope.

As optical elements 2 and 3 according to second and third embodiments, FIGS. 5 and 6 illustrate configuration examples of the optical elements having two inclined optically anisotropic layers. FIGS. 5 and 6 are schematic views of cross-sectional images of the respective optical elements 2 and 3. The cross-sectional images are SEM images respectively obtained by observing a cross-section cut in the thickness direction along one direction in which the horizontal rotational alignment is made, as described above.

As illustrated in FIG. 5, the two inclined optically anisotropic layers may be configured such that the inclination direction of the bright and dark lines in one inclined optically anisotropic layer 10 with respect to the normal line n is different from the inclination direction of the bright and dark lines in the other inclined optically anisotropic layer 22 with respect to the normal line n in the opposing regions of the two layers in the cross-sectional image. The inclination directions with respect to the normal line n are different from each other in a manner that the inclination direction of the bright and dark lines of one inclined optically anisotropic layer 10 with respect to the normal line n is on a negative side of the x-axis (a left side of the paper surface) while the inclination direction of the bright and dark lines of the other inclined optically anisotropic layer 22 with respect to the normal line n is on a positive side of the x-axis (a right side of the paper surface). The inclination angles of the bright and dark lines of the two inclined optically anisotropic layers with respect to the normal line n may be the same as ($\alpha_n = \beta_n$) or different from each other ($\alpha_n \neq \beta_n$) in the opposing regions. Further, in a case where the optical element comprises two inclined optically anisotropic layers, opposing regions where the inclination directions of the bright and dark lines are different from each other may be present over the entire area or in a part thereof. In the present specification, the opposing regions of the two inclined optically anisotropic layers are the same xy regions, which overlap each other as viewed from the thickness direction.

By setting the twist property of the twisted alignment of one inclined optically anisotropic layer 10 in the thickness direction to be opposite to the twist property of the twisted alignment of the other inclined optically anisotropic layer 22 in the thickness direction, the inclinations of the bright and dark lines with respect to the normal line can be set to be opposite to each other.

As illustrated in FIG. 6, the two inclined optically anisotropic layers may be configured such that the inclination direction of the bright and dark lines in one inclined optically anisotropic layer 10 with respect to the normal line n of the interface may be the same as the inclination direction of the bright and dark lines in the other inclined optically anisotropic layer 24 with respect to the normal line n of the interface in the opposing regions of the two layers in the cross-sectional image. Here, an inclination angle $\alpha_n$ of the bright and dark lines in one inclined optically anisotropic layer 10 may be different from an inclination angle $\gamma_n$ of the bright and dark lines in the other inclined optically anisotropic layer 24 in the opposing regions. Further, in a case where the optical element comprises two inclined optically anisotropic layers, the opposing regions where the inclination directions of the bright and dark lines are the same as each other may be present over the entire area or in a part thereof.

By making the twist pitch of the twisted alignment of one inclined optically anisotropic layer 10 in the thickness direction different from the twist pitch of the twisted alignment of the other inclined optically anisotropic layer 22 in the thickness direction, the inclinations of the bright and dark lines with respect to the normal line can be made different from each other. In a case where the twist pitches are different from each other, this indicates that the thicknesses over which the optical axes are twisted to the same twist angle are different from each other.

Further, the two inclined optically anisotropic layers included in one optical element may simultaneously have opposing regions where the inclination directions are the same as each other and opposing regions where the inclination directions are different from each other.

In the description above, the optical element that functions as a transmission type diffraction element has been described, but the optical element according to the embodiment of the present disclosure may also function as a reflection type diffraction element.

Figure 7:
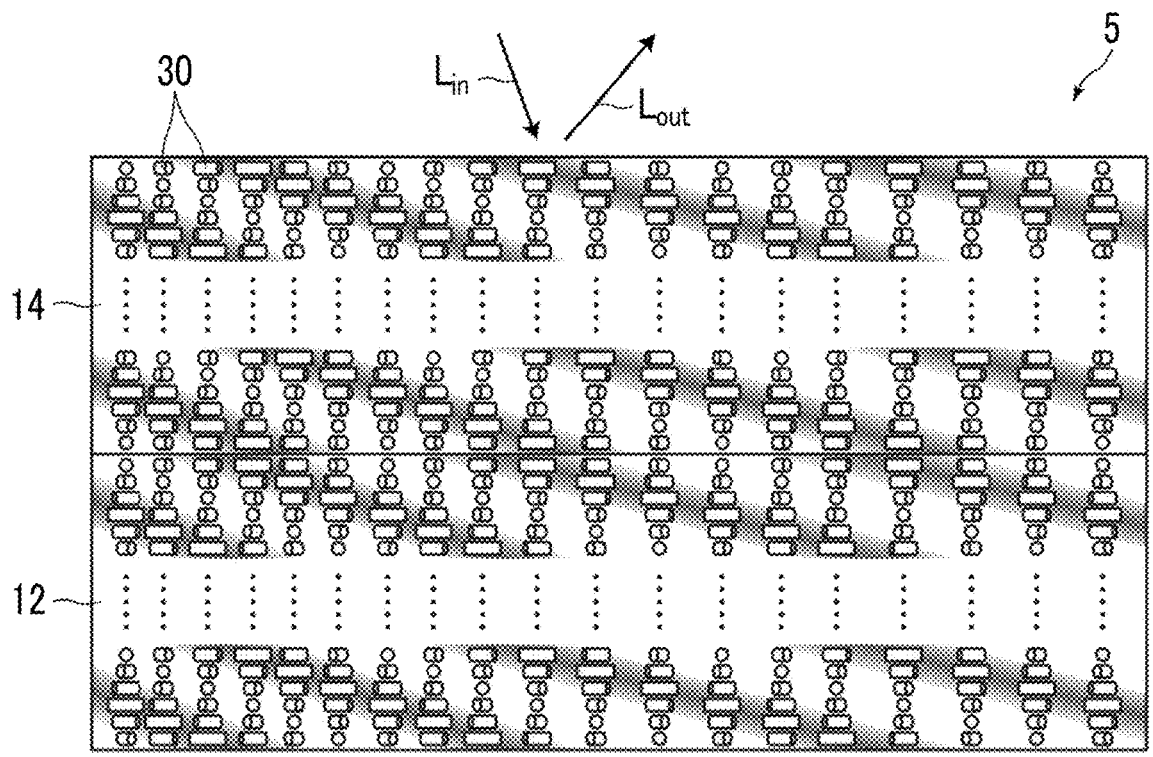
FIG. 7 is a view schematically illustrating a cross section of an optical element according to a fourth embodiment.

FIG. 7 is a cross-sectional view illustrating an optical element 5 according to a fourth embodiment, which functions as a reflection type diffraction element. FIG. 7 schematically illustrates bright and dark lines in a cross-sectional SEM image which are superimposed.

The optical element 5 comprises two inclined optically anisotropic layers 12 and 14. In both the two inclined optically anisotropic layers 12 and 14, optical axes are horizontally rotationally aligned and cholesterically aligned in the thickness direction. In the two inclined optically anisotropic layers 12 and 14, the orientations of rotating optical axes in the horizontal rotational alignment are opposite to each other, and the turning orientations of the cholesteric alignment are also opposite to each other.

The inclined optically anisotropic layers 12 and 14 each have cholesteric alignment and thus selectively reflect only light in a specific selected wavelength range of specific circularly polarized light. The center wavelength of light that is selectively reflected is determined by the cholesteric helical pitch and the film thickness, and which of the left and right circularly polarized light is reflected is determined by the rotation direction of the helix.

Since the liquid crystal alignment pattern has horizontal rotational alignment and cholesteric alignment, bright and dark lines which are inclined in the normal direction at different inclination angles similar to the embodiment described above are observed (see FIG. 7) in the cross-sectional image.

Since the alignment pattern of the optical axes 30A in the in-plane direction of each of the inclined optically anisotropic layers 12 and 14 is the horizontal rotational alignment as in the previous embodiments, the same action as that of the optical element 1 is generated. That is, the absolute phase of the incidence ray is changed so that an action of allowing the light to be bent in a predetermined direction is exerted. Therefore, the optical element 5 has both an action of allowing the incidence ray to be bent in a direction different from the incident direction and an action generated by the above-described cholesteric alignment, and reflects light at an angle in a predetermined direction with respect to the reflection direction of the specular reflection. Further, since the optical element 5 has regions where the periods of horizontal rotational alignment are different from each other in the in-plane direction, the optical element can reflect light can be reflected at different reflection angles with respect to the same incidence angle.

Further, the average diffraction efficiency in a case of allowing light to be incident by changing the incidence angle depending on the region can be improved, and the difference in the intensity of reflected light can be suppressed.

In each of the above-described embodiments, a pattern in which one period of the horizontal rotational alignment gradually lengthens in the x direction is described. In the optical element, it is preferable that the optically anisotropic layer has an in-plane alignment pattern in which one period gradually shortens toward one end and the other end from the center in the uniaxial direction in the plane.

Figure 8:
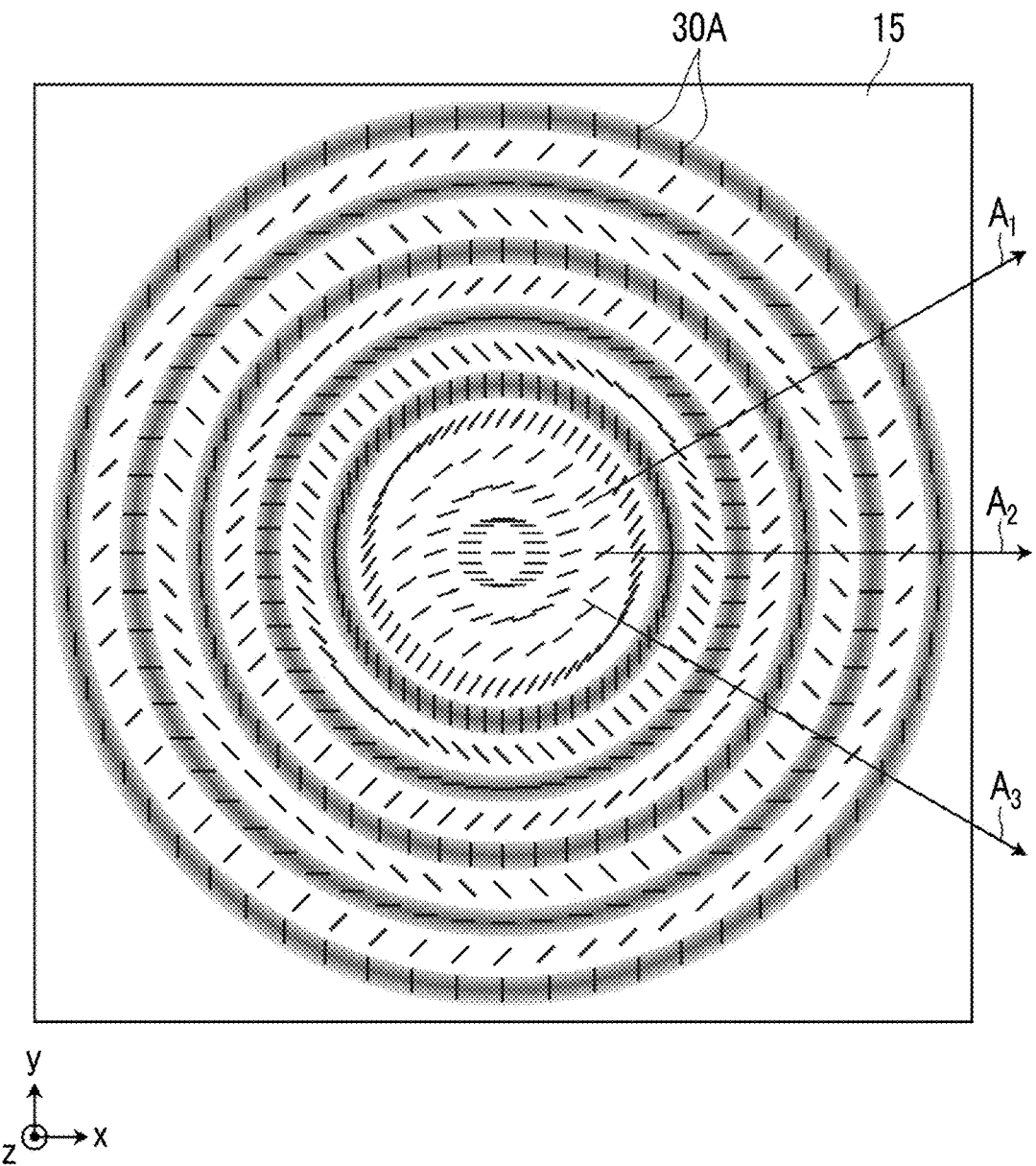
FIG. 8 is a plan view schematically illustrating an alignment pattern of optical axes on a surface of an optical element of a design change example.

Further, as illustrated in FIG. 8, it is also preferable that the optically anisotropic layer has an in-plane alignment pattern in which one direction of horizontal rotational alignment is set radially from the inside to the outside. FIG. 8 is a schematic plan view illustrating an optically anisotropic layer of an optical element in a design change example. FIG. 8 illustrates the in-plane alignment pattern with the alignment of the optical axes 30A of the liquid crystal compound. The optically anisotropic layer has an in-plane alignment pattern in which regions where the orientations of the optical axes are the same as each other are concentrically provided, and one direction in which the orientations of the optical axes 30A change continuously and rotationally is provided radially from the center of the optically anisotropic layer 15.

In the optically anisotropic layer 15, the orientations of the optical axes 30A change continuously and rotationally along a plurality of directions toward the outside from the center of the optically anisotropic layer 15, for example, a direction indicated by an arrow $A_1$, a direction indicated by an arrow $A_2$, and a direction indicated by an arrow $A_3$. The orientations of the rotating optical axes that rotate along each axial direction are rotationally symmetric with respect to the center of the optically anisotropic layer.

In a case where the optical element 1 is observed with an optical microscope in a state where the optical element 1 comprising the optically anisotropic layers each having the in-plane alignment pattern illustrated in FIG. 8 is interposed between two polarizers orthogonal to each other, bright portions and dark portions are concentrically alternately observed. The period of the bright and dark portions (that is, the period of the dark portions or the period of the bright portions) on surface of the concentric periodic alignment is half of the period A of the horizontal rotational alignment pattern. Since the period gradually shortens toward the outside, a difference between diameters of concentric circles adjacent to each other decreases in a case of concentric circles which are present on the outer side.

The absolute phase of circularly polarized light that is incident on the optically anisotropic layer 15 having the in-plane alignment pattern changes in each local region where the orientations of the optical axes of the liquid crystal compound 30 are different from each other. In this case, the amount in change of each absolute phase varies depending on the orientations of the optical axes of the liquid crystal compound 30 on which the circularly polarized light is incident.

As described above, the angle of refraction of light with respect to the incident direction increases as one period A in the liquid crystal alignment pattern shortens. Therefore, the focusing power or diverging power of light due to the optically anisotropic layer 15 can be further improved by gradually shortening one period A in the in-plane alignment pattern from the center of the optically anisotropic layer 15 toward the outer direction of one direction in which the optical axes continuously rotate.

On the contrary, one period A in the concentric liquid crystal alignment pattern may gradually lengthens from the center of the optically anisotropic layer 15 toward the outer direction of one direction in which the optical axes continuously rotate.

Further, in a case where light quantity distribution is expected to be provided for transmitted light, a configuration in which regions where one period A partially varies in one direction in which optical axes continuously rotate without gradually changing one period A in one direction in which optical axes continuously rotate depending on the applications of the optical element can also be used.

Next, the constituent element materials comprised in the optical element according to the embodiment of the present disclosure and the forming method will be described.

<Optically Anisotropic Layer>

The liquid crystal composition for forming an optically anisotropic layer, which contains a liquid crystal compound may contain other components such as a leveling agent, an alignment control agent, a polymerization initiator, and an alignment assistant in addition to the liquid crystal compound. The optically anisotropic layer which is formed of a cured layer of the liquid crystal composition and to which a predetermined liquid crystal alignment pattern is fixed can be obtained by forming an alignment film on the support, coating the alignment film with the liquid crystal composition, and curing the composition.

—Rod-Like Liquid Crystal Compound—

Preferred examples of the rod-like liquid crystal compound include azomethines, azoxys, cyanobiphenyls, cyanophenyl esters, benzoic acid esters, cyclohexanecarboxylic acid phenyl esters, cyanophenyl cyclohexanes, cyano-substituted phenyl pyrimidines, alkoxy-substituted phenyl pyrimidines, phenyldioxane, tolanes, and alkenyl cyclohexyl benzonitriles. High-molecular-weight liquid crystal molecules as well as such low-molecular-weight liquid crystal molecules can also be used.

It is more preferable that the alignment of the rod-like liquid crystal compound is fixed by polymerization, and compounds described in Makromol. Chem., Vol. 190, p. 2255 (1989), Advanced Materials, Vol. 5, p. 107 (1993), U.S. Pat. Nos. 4,683,327A, 5,622,648A, 5,770,107A, WO95/022586A, WO95/024455A, WO97/000600A, WO98/023580A, WO98/052905A, JP1989-272551A (JP-H01-272551A), JP1994-016616A (JP-H06-016616A), JP1995-110469A (JP-H07-110469A), JP1999-080081A (JP-H11-080081A), and JP2001-328973A can be used as the polymerizable rod-like liquid crystal compounds. Further, compounds described in JP1999-513019A (JP-H11-513019A) and JP2007-279688A can be preferably used as the rod-like liquid crystal compounds.

—Disk-Like Liquid Crystal Compound—

Compounds described in JP2007-108732A and JP2010-244038A can be preferably used as the disk-like liquid crystal compounds.

—Other Components—

Known materials can be used as other components such as an alignment control agent, a polymerization initiator, and an alignment assistant. Further, a chiral agent is added to obtain an optically anisotropic layer having twisted alignment in the thickness direction or an optically anisotropic layer having cholesteric alignment in the thickness direction.

—Chiral Agent (Optically Active Compound)—

A chiral agent has a function of inducing a helical structure of a cholesteric liquid crystalline phase. The chiral agent may be selected depending on the purpose thereof because the helical twist direction or the helical pitch induced by a compound varies.

The chiral agent is not particularly limited, and known compounds (for example, Liquid Crystal Device Handbook, section 4-3 in Chapter 3, chiral agent for twisted nematic (TN) and super twisted nematic (STN), p. 199, edited by Japan Society for the Promotion of Science, 142th Committee, 1989), isosorbide, and isomannide derivatives can be used.

The chiral agent typically contains asymmetric carbon atoms, but an axially asymmetric compound or planarly asymmetric compound that does not contain asymmetric carbon atoms can also be used as a chiral agent. Examples of the axially asymmetric compound and the planarly asymmetric compound include binaphthyl, helicene, paracyclophane, and derivatives thereof. The chiral agent may contain a polymerizable group. In a case where both the chiral agent and the liquid crystal compound contain a polymerizable group, a polymer having a repeating unit derived from a polymerizable liquid crystal compound and a repeating unit derived from a chiral agent can be formed by the polymerization reaction between the polymerizable chiral agent and the polymerizable liquid crystal compound. In this form, it is preferable that the polymerizable group contained in the polymerizable chiral agent is the same group as the polymerizable group contained in the polymerizable liquid crystal compound. Therefore, as the polymerizable group of the chiral agent, an unsaturated polymerizable group, an epoxy group, or an aziridinyl group is preferable, an unsaturated polymerizable group is more preferable, and an ethylenically unsaturated polymerizable group is still more preferable.

Further, the chiral agent may be a liquid crystal compound.

It is preferable that the chiral agent contains a photoisomerizable group because a pattern of a desired reflection wavelength corresponding to an emission wavelength can be formed by photomask irradiation using actinic rays or the like after application and alignment. As the photoisomerizable group, an isomerizable site of a compound exhibiting photochromic properties, an azo group, an azoxy group, or a cinnamoyl group is preferable. As specific compounds, compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A can be used.

—Solvent—

As a solvent of the liquid crystal composition, an organic solvent is preferably used. Examples of the organic solvent include an amide (such as N,N-dimethylformamide), a sulfoxide (such as dimethyl sulfoxide), a heterocyclic compound (such as pyridine), a hydrocarbon (such as benzene or hexane), an alkyl halide (such as chloroform or dichloromethane), an ester (such as methyl acetate or butyl acetate), a ketone (such as acetone, methyl ethyl ketone, or cyclohexanone), and an ether (such as tetrahydrofuran or 1,2-dimethoxyethane). Among these, an alkyl halide and a ketone are preferable. A combination of two or more kinds of organic solvents may be used.

<Formation of Optically Anisotropic Layer>

The optically anisotropic layer can be formed, for example, by multilayer-coating the alignment film with the liquid crystal composition. The multilayer-coating is performed by coating the alignment film with the liquid crystal composition, heating the composition, cooling the composition, and curing the composition with ultraviolet rays to prepare the liquid crystal fixing layer as the first layer. The second and subsequent liquid crystal fixing layers are obtained by repeating the processes of overcoating the liquid crystal fixing layer with the composition, heating the composition, cooling the composition, and curing the composition using ultraviolet rays.

<Support>

A support supports the optically anisotropic layer or the optically anisotropic layer and the alignment film. The support is not an indispensable constituent element of the optical element. The support may be used in a case of forming the optically anisotropic layer and then peeled off.

As the support, various sheet-like materials (such as a film and a plate-like material) can be used as long as these materials can support the optically anisotropic layer.

As the support, a transparent support is preferable, and examples thereof include a polyacrylic resin film such as polymethyl methacrylate; a cellulose-based resin film such as cellulose triacetate; and cycloolefin polymer-based films (such as "ARTON" (trade name, manufactured by JSR Corporation) and "ZEONOR" (trade name, manufactured by Zeon Corporation)), polyethylene terephthalate (PET), polycarbonate, and polyvinyl chloride. The support is not limited to a flexible film, and an inflexible substrate such as a glass substrate may be used.

The thickness of the support is not limited and may be appropriately set so as to hold the alignment film and the optically anisotropic layer depending on the applications of the optical element, the material for forming the support, and the like.

The thickness of the support is preferably in a range of 1 to 1000 µm, more preferably in a range of 3 to 250 µm, and still more preferably in a range of 5 to 150 µm.

<Alignment Film>

An alignment film is provided to align the liquid crystal compound in a predetermined liquid crystal alignment pattern in a case of forming the optically anisotropic layer.

As the alignment film, various known films can be used.

Examples of known films include a rubbed film formed of an organic compound such as a polymer, an obliquely deposited film of an inorganic compound, a film having microgrooves, and a film obtained by accumulating Langmuir-Blodgett (LB) films formed of an organic compound such as ω-tricosanoic acid, dioctadecylmethylammonium chloride, or methyl stearate according to a Langmuir-Blodgett method.

The alignment film formed by a rubbing treatment can be formed by rubbing a surface of a polymer layer with paper or cloth several times in a certain direction.

Preferred examples of the material used for the alignment film include polyimide, polyvinyl alcohol, polymers containing polymerizable groups described in JP1997-152509A (JP-H09-152509A), and materials used for forming alignment films described in JP2005-097377A, JP2005-099228A, and JP2005-128503A.

In the optical element according to the embodiment of the present disclosure, a so-called photo-alignment film, which is obtained by irradiating a photo-aligning material with polarized light or non-polarized light to form an alignment film, is preferably used as the alignment film. That is, in the optical element according to the embodiment of the present disclosure, a photo-alignment film formed by coating the support with a photo-alignment material is suitably used as the alignment film.

The photo-alignment film can be irradiated with polarized light in a vertical direction or an oblique direction, and the photo-alignment film can be irradiated with non-polarized light in an oblique direction.

Preferred examples of the photo-alignment material used for the photo-alignment film include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B, aromatic ester compounds described in JP2002-229039A, maleimide and/or alkenyl-substituted nadiimide compounds having photo-alignment units described in JP2002-265541A and JP2002-317013A, photo-crosslinkable silane derivatives described in JP4205195B and JP4205198B, photo-crosslinkable polyimides, photo-crosslinkable polyamides, and photo-crosslinkable esters described in JP2003-520878A, JP2004-529220A, and JP4162850B, and compounds capable of photodimerization, particularly cinnamate compounds, chalcone compounds, and coumarin compounds described in JP1997-118717A (JP-H09-118717A), JP1998-506420A (JP-H10-506420A), JP2003-505561A, WO2010/150748A, JP2013-177561A, JP2014-012823A.

Among these, azo compounds, photo-crosslinkable polyimides, photo-crosslinkable polyamides, photo-crosslinkable esters, cinnamate compounds, and chalcone compounds are suitably used.

The thickness of the alignment film is not limited and may be appropriately set so as to obtain a required alignment function according to the material for forming the alignment film.

The thickness of the alignment film is preferably in a range of 0.01 to 5 μm and more preferably in a range of 0.05 to 2 μm.

A method of forming the alignment film is not limited, and various known methods can be used according to the material for forming the alignment film. As the method, a method of coating a surface of a support with an alignment film, drying the film, and exposing the alignment film to laser light to form an alignment pattern is exemplified.

Figure 9:
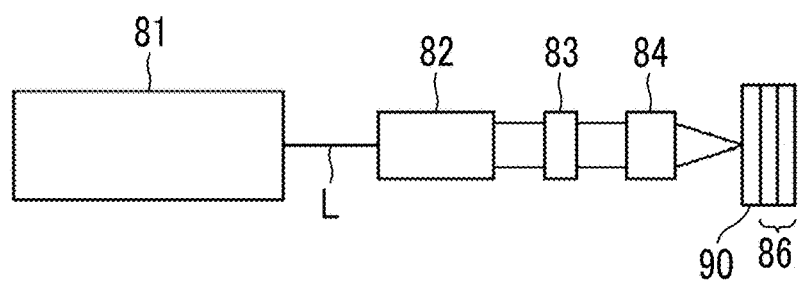
FIG. 9 is a view conceptually illustrating an example of an exposure device that exposes an alignment film to form an alignment pattern.

FIG. 9 conceptually illustrates an example of an exposure device that exposes the alignment film to form an alignment pattern. The exposure device comprises a laser light source 81 that emits laser light, a beam expander 82 that expands the beam diameter of laser light L emitted from the laser light source 81, a λ/2 plate 83 that is disposed on an optical path of the laser light L, and a drive stage 86 provided with a lens 84 and an alignment film 90. The λ/2 plate 83 is attached to a rotary mount (not illustrated) and functions as a variable polarization rotator.

The beam diameter of the laser beam L emitted from the laser light source 81 is expanded by the beam expander 82, adjusted in an optional polarization direction by the rotation of the λ/2 plate 83, the laser light is condensed on the photo-alignment film by the lens 84, and the drive stage 86 is driven to scan-expose and pattern the photo-alignment film. In this manner, a patterned alignment film having a desired pattern can be formed.

In the optical element according to the embodiment of the present disclosure, the alignment film is provided as a preferred embodiment and is not an indispensable constituent element.

For example, an optically anisotropic layer having a horizontal rotational alignment pattern can be formed by forming an alignment pattern on the support according to a method of performing a rubbing treatment on the support, a method of processing the support with laser light, or the like.

In each of the above-described optical elements, a configuration that basically assumes an incidence ray having a single wavelength has been described, but a configuration that exerts the same effect on an incidence ray having multiple wavelengths can also be employed. In a case where an optical element having a structure in which optically anisotropic layers having a liquid crystal alignment pattern corresponding to each wavelength are laminated is employed, an incidence ray having multiple wavelengths can be used.

[Light Deflection Device]

Figure 10:
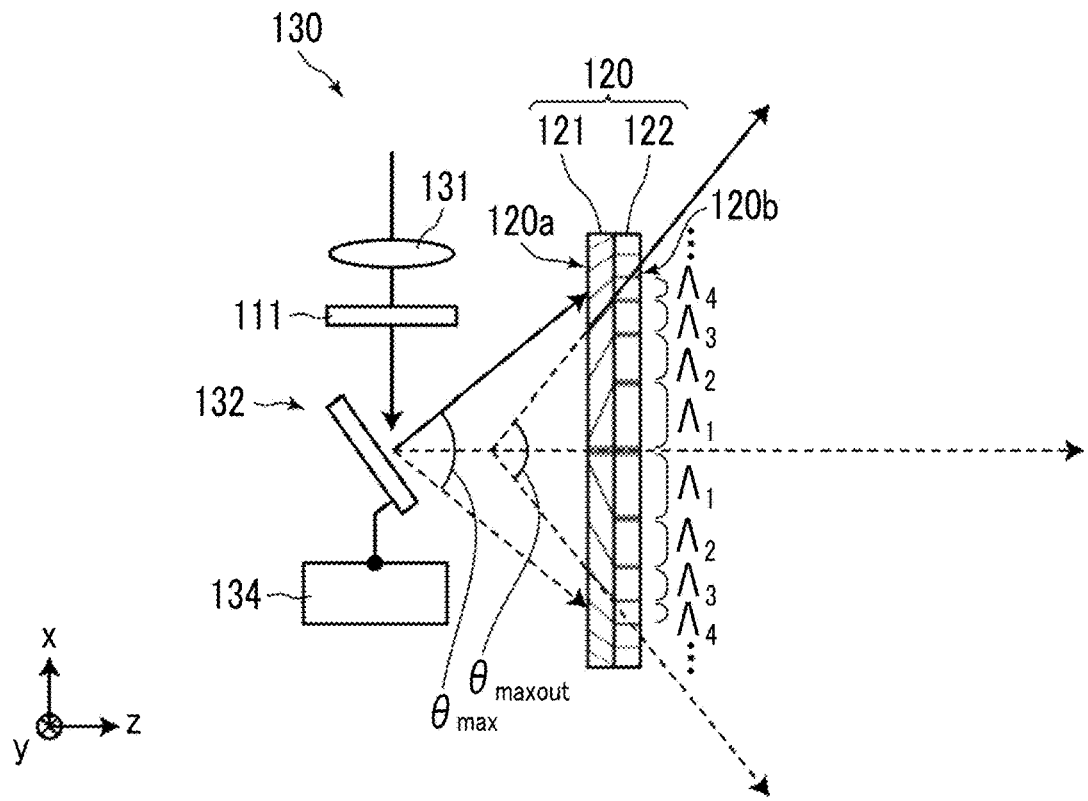
FIG. 10 is a view illustrating a schematic configuration of an example of a light deflection device.

FIG. 10 is a schematic configuration view illustrating an example of a light deflection device according to an embodiment.

A light deflection device 130 includes a condensing lens 131, λ/4 plate 111, a light deflection element 132, and an optical element 120 according to an embodiment of the present invention, from the upstream side in the traveling direction of light (light beam). In the description below, the upstream and the downstream each indicate the upstream and the downstream in the traveling direction of light.

The condensing lens 131 is a known condensing lens, and is provided to allow light (light beam) from a light source (not illustrated) to be incident on the light deflection element 132 in a state where the light is slightly condensed. The condensing lens 131 is provided as a preferred embodiment and is not an indispensable constituent element. However, in a case where the light deflection device comprises the condensing lens 131, the light (light beam) emitted from the light deflection device 130 can be made into appropriate parallel light, and the straightness can be improved.

Further, the condensing lens is not limited to the condensing lens 131, and all known condensing elements capable of condensing light (light beam) can be used.

The λ/4 plate 111 is a known λ/4 plate (1/4 phase difference plate) that converts linearly polarized light emitted to the outside from a light source into circularly polarized light. As the λ/4 plate 111, known plates can be used without limitation. Therefore, the λ/4 plate 111 may be derived from a polymer or a liquid crystal. The λ/4 plate 111 may be disposed between the MEMS (Micro Electro Mechanical System) light deflection element 132 and the optical element 120. However, from the viewpoints of miniaturizing the λ/4 plate 111 and the like, it is preferable that the λ/4 plate 111 is provided in the upstream of the MEMS light deflection element 132. In a case where circularly polarized light is incident on the light deflection device 130 including the MEMS light deflection element 132, the λ/4 plate 111 may not be provided.

The light deflection element 132 is a MEMS light deflection element that two-dimensionally scans light. The MEMS light deflection element is not particularly limited, and known MEMS light deflection elements (a MEMS (light) scanner, a MEMS light deflector, a MEMS mirror, and a digital micromirror device (DMD)) that swing a mirror using a piezoelectric actuator or the like to deflect (deflect and scan) light, such as the MEMS light deflection element described in JP2012-208352A, the MEMS light deflection element described in JP2014-134642, and the MEMS light deflection element described in JP2015-022064A can be appropriately used.

A driving device 134 for rotationally driving a mirror is connected to the light deflection element 132. As the driving device 134, a known device may be used according to the configuration of the MEMS light deflection element 132 and the like.

The optical element 120 comprises two optically anisotropic layers each having an in-plane liquid crystal alignment pattern in which optical axes are horizontally rotationally aligned along axes provided radially from the center and the period shortens toward the outside, as illustrated in FIG. 8. As illustrated in FIG. 10, the period shortens toward the outside ($\Lambda_1 > \Lambda_2 > \Lambda_3 > \Lambda_4 \ldots$) as compared with the period $\Lambda_1$ in a central region of the optical element 120. Here, one optically anisotropic layer 121 is an inclined optically anisotropic layer, and the other optically anisotropic layer 122 is an optically anisotropic layer that does not have a twist property in the thickness direction and has a uniform pattern in the thickness direction. The optical element 120 is disposed such that the center thereof matches the center of deflection of the light deflection element 132. The inclination of the bright and dark lines with respect to the normal line in the cross-sectional SEM image of the optical element 120 is larger toward the center and smaller toward the outside.

In the light deflection device 130, polarized light P which has been emitted from a light source (not illustrated) is slightly condensed on an emission surface 120b of the optical element 120 by the condensing lens 131 and converted into right circularly polarized light by the λ/4 plate 111.

The light converted into circularly polarized light by the λ/4 plate 111 is deflected by the MEMS light deflection element 132 and incident on an incident surface 120a of the optical element 120. The light that is incident on the optical element 120 is diffracted and emitted from the emission surface 120b of the optical element 120, that is, the light deflection device 130.

Since the optical element 120 is disposed such that the center thereof matches the center of deflection of the light deflection element 132, the light scanned by the light deflection element 132 is incident on one surface of the optical element at a larger incidence angle as the distance from the center of one surface of the optical element 120 increases. The period of the horizontal rotational alignment is configured to shorten as the distance from the center increases, and the bending force is stronger toward the outside. Therefore, the optical element 120 is unlikely to generate a bending force with respect to an incidence ray which has been incident vertically, transmits the light as it is, bends the light toward the outside of the optical element 120, and emits the light. The optical element 120 allows polarized light to which a bending force is applied from the center to the outside to be incident as an incidence ray by the horizontal rotational alignment of the optically anisotropic layers 121 and 122, and thus a scan angle θmaxout that is larger than a scan angle θmax of the light deflection element 132 can be obtained.

Here, in a case where the incidence angle of light that is incident on the incident surface 120a of the optical element 120 is set as θ1, the refractive index of a medium on the incidence side is set as n1, the emission angle of light that is emitted from the emission surface 120b of the optical element 120 is set as θ2, the refractive index of a medium on the emission side is set as n2, the wavelength of light is set as λ, the periodic structure pitch of a liquid crystal diffraction element is set as Λ, and the order of diffraction is set as m, these values are correlated with each other by Equation (1).

$$n1 \cdot \sin\theta1 - n2 \cdot \sin\theta2 = m \cdot \lambda / \Lambda \quad (1)$$

As described above, the angle of the emitted light from the optical element 120 can be changed by changing the period Λ of the horizontal rotational alignment pattern in the optically anisotropic layer of the optical element 120.

In consideration of the Snell's law, the angle of the emitted light to be finally emitted into the air can be expanded up to an absolute value of approximately 80°, and thus the emission angle can be expanded to an extremely large angle. Further, light can be emitted continuously in an optional direction by continuously changing the period of the horizontal rotational alignment pattern in the optically anisotropic layer of the optical element 120 in the plane.

As is evident from the description above, the light deflection device according to the embodiment of the present disclosure can perform light scanning at a scan angle wider than the scan angle (angle of view) of the light deflection element. FIG. 10 illustrates a state where the scan angle in the x direction is widened, and the scan angle in the y direction can be widened based on the same principle because the horizontal rotational alignment pattern is provided radially. Therefore, in a case where deflected light (scanning light) from the light deflection element 132 is diffracted and scanned using the optical element 120, the scanning range can be greatly expanded further than the scanning range where two-dimensional scanning is performed by the light deflection element 132.

Even in a case where the optical element 120 applied to such a light deflection device 130 does not comprise the inclined optically anisotropic layer 121, the effect of widening the scan angle can be obtained. However, in a case where an optical element comprising only the optically anisotropic layer 122 without comprising the inclined optically anisotropic layer 121 is applied, there is a problem in that a difference in diffraction efficiency between a region near the center where the incidence angle is small and a region of an outer peripheral portion where the incidence angle is large and the diffraction angle widens is large, and accordingly, the diffraction efficiency as a whole (average diffraction efficiency) is low. By allowing the optical element to comprise the inclined optically anisotropic layer 121, the diffraction efficiency of the outer peripheral portion of the element where the incidence angle widens can be improved, the difference in diffraction efficiency due to the incident position and the incidence angle can be suppressed, and variation in light quantity of the emitted light can be suppressed. Further, the average diffraction efficiency can also be improved by allowing the optical element to comprise two or more optically anisotropic layers.

Further, in the light deflection device, the optical element is not limited to the above-described optical element 120, and for example, an optical element comprising an optically anisotropic layer that has a horizontal rotational alignment pattern in which the period gradually shortens from one side to the other side in the x-axis direction as illustrated in FIG. 1 may be used. Further, an optical element comprising an optically anisotropic layer which has a horizontal rotational alignment pattern in which the period gradually shortens from the center of the element to the outside in the x-axis direction and in which the rotation directions of the optical axes of the horizontal rotational alignment patterns on both sides with the center therebetween are opposite to each other may be used.

EXAMPLES

Hereinafter, the features of the present invention will be described in more detail with reference to examples. The materials, the reagents, the used amounts, the substance amounts, the ratios, the treatment contents, the treatment procedures, and the like described in the following examples can be appropriately changed without departing from the spirit of the present invention. Therefore, the scope of the present invention should not be limitatively interpreted by the specific examples described below. In the following examples and comparative examples, a liquid crystal alignment pattern was designed by assuming infrared light having a target wavelength of 940 nm as an incidence ray.

Comparative Example 1

Figure 11:
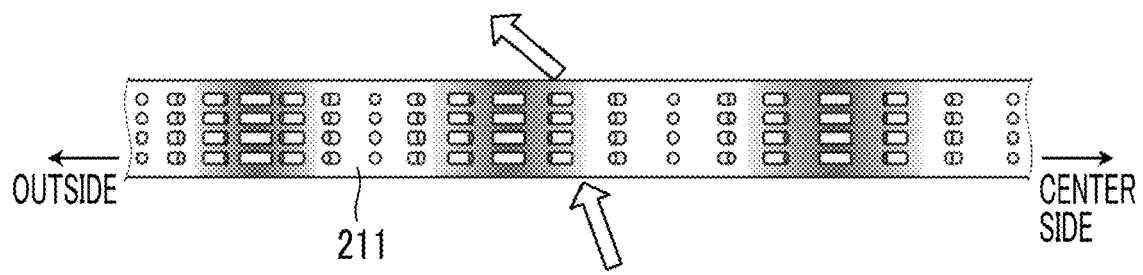
FIG. 11 is a view illustrating a layer configuration of an optical element of Comparative Example 1.

An optical element comprising a non-inclined optically anisotropic layer 211 as a first optically anisotropic layer in which bright and dark lines were not inclined in a cross-sectional SEM image was prepared in Comparative Example 1 (see FIG. 11).

<Preparation of Optical Element>
(Formation of Alignment Film)

A glass substrate was spin-coated with the following coating solution for forming an alignment film. The support on which the coated film formed of the coating solution for forming an alignment film was formed was dried on a hot plate at 60° C. for 60 seconds, thereby forming an alignment film.

Coating solution for forming alignment film
Material A for photo-alignment: 1.00 parts by mass
Water: 16.00 parts by mass
Butoxyethanol: 42.00 parts by mass
Propylene glycol monomethyl ether: 42.00 parts by mass
—Material a for Photo-Alignment—

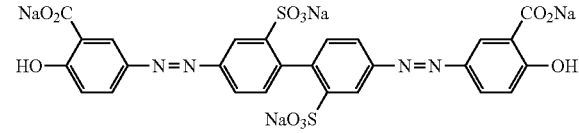

(Exposure of Alignment Film)

An alignment film P-1 having an alignment pattern was formed by exposing the alignment film using an exposure device for scan-exposing and patterning the photo-alignment film while the polarization direction of the condensed laser light illustrated in FIG. 9 was optionally changed. An exposure device emitting laser light having a wavelength (325 nm) as a laser was used as the exposure device. Further, the alignment pattern was set to be concentric, and one period of the alignment pattern was set to gradually shorten from the center to the outer direction.

(Formation of First Optically Anisotropic Layer)

The following composition A-1 was prepared as a liquid crystal composition forming an optically anisotropic layer.

Composition A-1
Liquid crystal compound L-1: 100.00 parts by mass
Polymerization initiator (Irgacure (registered trademark) 907, manufactured by BASF SE): 3.00 parts by mass
Photosensitizer (KAYACURE DETX-S, manufactured by Nippon Kayaku Co., Ltd.): 1.00 parts by mass
Leveling agent T-1: 0.08 parts by mass
Methyl ethyl ketone: 2840.00 parts by mass
Liquid crystal compound L-1

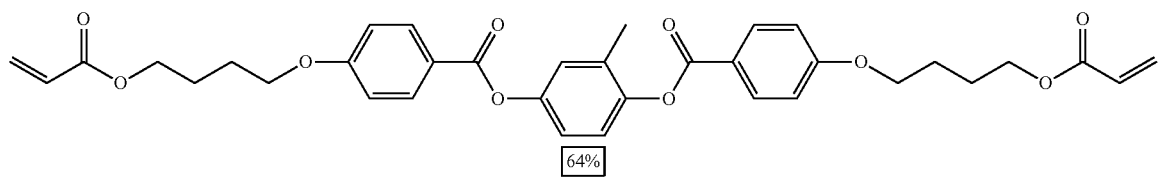

64%

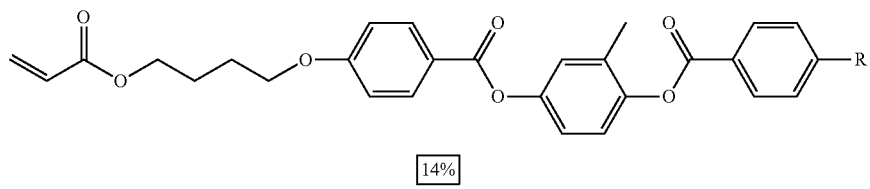

14%

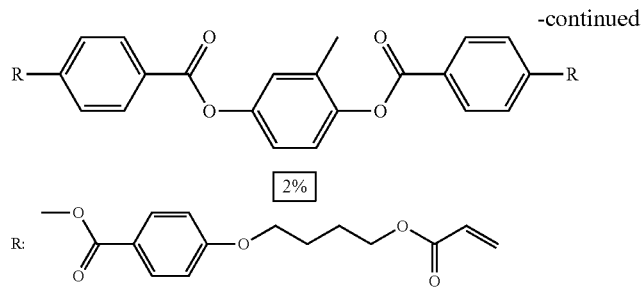

Leveling agent T-1

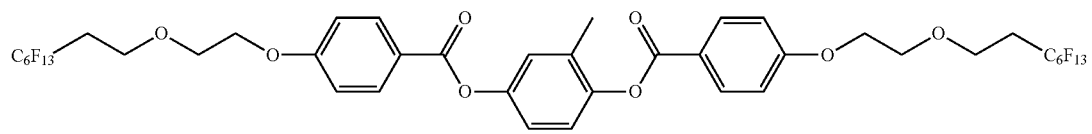

The first optically anisotropic layer was formed by multilayer-coating the alignment film P-1 with the composition A-1. First, the alignment film was coated with the composition A-1 as a first layer, heated, cooled, and cured with ultraviolet rays to prepare a liquid crystal fixing layer, and as second and subsequent layers, the liquid crystal fixing layer was overcoated with the composition, heated, cooled, and cured with ultraviolet rays repeatedly as described above.

First, as the first layer, the coated film obtained by coating the alignment film P-1 with the following composition A-1 was heated on a hot plate at 70° C. and then cooled to 25° C., and the coated film was irradiated with ultraviolet rays having a wavelength of 365 nm at an irradiation dose of 300 mJ/cm² using a high-pressure mercury lamp in a nitrogen atmosphere, thereby fixing the alignment of the liquid crystal compound. Here, the film thickness of the first liquid crystal layer was 0.2 μm.

As the second and subsequent layers, the liquid crystal layer was overcoated, heated, cooled, and cured with ultraviolet rays under the same conditions as described above, thereby preparing a liquid crystal fixing layer. In this manner, the layer was repeatedly overcoated until the total thickness reached a desired film thickness to form the first optically anisotropic layer.

The optical element of Comparative Example 1 was produced by performing the above-described steps.

Further, the complex refractive index Δn of the cured layer of the liquid crystal composition A1 was acquired by measuring the retardation Re (k) and the film thickness of the liquid crystal fixing layer (cured layer) obtained by coating a support provided with an alignment film for measuring the retardation which was separately prepared, with the liquid crystal composition A1, aligning the director of the liquid crystal compound to be horizontal to the base material, and performing irradiation with ultraviolet rays for fixation. Further, $\Delta n_\lambda$ can be calculated by dividing the retardation Re (λ) by the film thickness. The retardation Re (λ) was measured at a target wavelength using a spectroscopic ellipsometer (manufactured by J. A. Woollam), and the film thickness was measured using an SEM. In the notation of Re (λ), λ indicates the wavelength of an incidence ray. In the description below, the wavelength λ of the incidence ray was set to 940 nm.

It was confirmed that the first optically anisotropic layer was formed such that "$\Delta n_{940} \times$ thickness" of a liquid crystal was finally Re (940) of 470 nm and had a concentric periodic alignment surface as illustrated in FIG. 8 using a polarizing microscope. The concentric periodic alignment surface indicates an in-plane alignment pattern in which the axes of horizontal rotational alignment are arranged radially from the center. In the horizontal rotational alignment pattern of the first optically anisotropic layer, one period was extremely large at the central portion (the reciprocal of the period can be regarded as 0), which was 9.0 μm at a distance of 1.0 mm from the center, 4.5 μm at a distance of 2.5 mm from the center, and 3.0 μm at a distance of 4.0 mm from the center, and the period shortened toward the outer direction. Further, the twist angle of the first optically anisotropic layer in the thickness direction was 0°. Hereinafter, unless otherwise specified, measurements such as "$\Delta n_{940} \times$ thickness" were carried out in the same manner as described above. Further, in the cross-sectional image obtained using an SEM, bright and dark lines extending in the direction perpendicular to the lower interface (the interface between the optically anisotropic layer and the glass substrate) of the optically anisotropic layer, that is, along the normal line were observed. In the repeating pattern of the bright and dark lines, a state where the period of the pattern shortened from the center to the outside was observed.

Example 1

Figure 12:
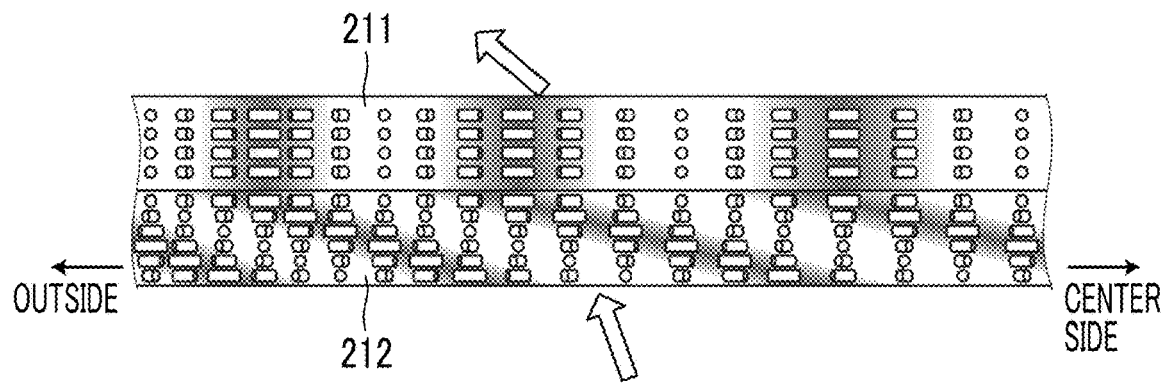
FIG. 12 is a view illustrating a layer configuration of an optical element of Example 1.

An optical element comprising two optically anisotropic layer in which the first optically anisotropic layer was an inclined optically anisotropic layer 212 formed such that bright and dark lines were inclined to the normal line of the interface in a cross-sectional SEM image and the second optically anisotropic layer was a non-inclined optically anisotropic layer 211 was prepared in Example 1 (see FIG. 12).

(Formation of First Optically Anisotropic Layer)

The following composition A-2 was prepared as a liquid crystal composition for forming an optically anisotropic layer.

Composition A-2

Liquid crystal compound L-1: 100.00 parts by mass

Chiral agent A: 0.21 parts by mass

Polymerization initiator (Irgacure (registered trademark) 907, manufactured by BASF SE): 3.00 parts by mass
Photosensitizer (KAYACURE DETX-S, manufactured by Nippon Kayaku Co., Ltd.): 1.00 parts by mass
Leveling agent T-1: 0.08 parts by mass
Methyl ethyl ketone: 2840.00 parts by mass
Chiral agent A

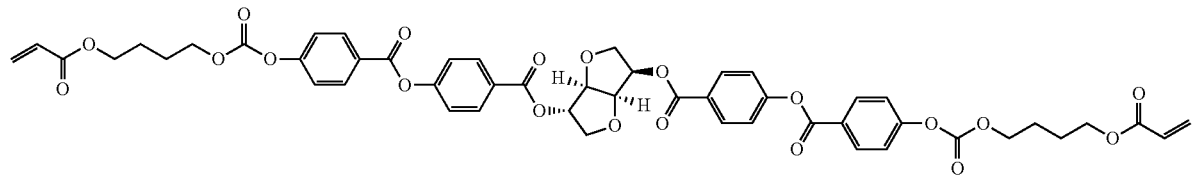 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

The first optically anisotropic layer was formed on the alignment film P-1 in the same manner as in Comparative Example 1 except that the composition A-2 was used.

(Formation of Second Optically Anisotropic Layer)

A second optically anisotropic layer of Example 1 was the same as the first optically anisotropic layer of Comparative Example 1, and the second optically anisotropic layer was formed on the first optically anisotropic layer in the same manner as that for the first optically anisotropic layer of Comparative Example 1 using the composition A-1, thereby preparing an optical element of Example 1.

It was confirmed that the first optically anisotropic layer and the second optically anisotropic layer were formed such that "$\Delta n_{940} \times$thickness" of a liquid crystal was finally Re (940) of 470 nm and each had a concentric periodic alignment surface as illustrated in FIG. 8 using a polarizing microscope. In the horizontal rotational alignment pattern of the first optically anisotropic layer, one period was extremely large at the central portion (the reciprocal of the period can be regarded as 0), which was 9.0 μm at a distance of 1.0 mm from the center, 4.5 μm at a distance of 2.5 mm from the center, and 3.0 μm at a distance of 4.0 mm from the center, and the period shortened toward the outer direction. Further, since the second optically anisotropic layer was formed on the first optically anisotropic layer by coating the first optically anisotropic layer, the period of the second optically anisotropic layer was the same as the period of the first optically anisotropic layer. In the description below, the periods of other layers formed by coating the first optically anisotropic layer were the same as each other. Further, the twist angle of the first optically anisotropic layer in the thickness direction was a right twist angle of 140°. The twist angle of the second optically anisotropic layer in the thickness direction was 0°. Further, in the cross-sectional image obtained using an SEM, bright and dark lines obliquely inclined to the normal line of the lower interface (the interface between the optically anisotropic layer and the glass substrate) of the optically anisotropic layer were observed in the first optically anisotropic layer, and bright and dark lines extending in the normal direction were observed in the second optically anisotropic layer. In the first optically anisotropic layer, the inclination angle of the bright and dark lines with respect to the normal line was smaller from the center to the outside. In both the first optically anisotropic layer and the second optically anisotropic layer, a state where the period of the pattern of the bright and dark lines shortened from the center to the outside was observed.

Example 2

Figure 13:
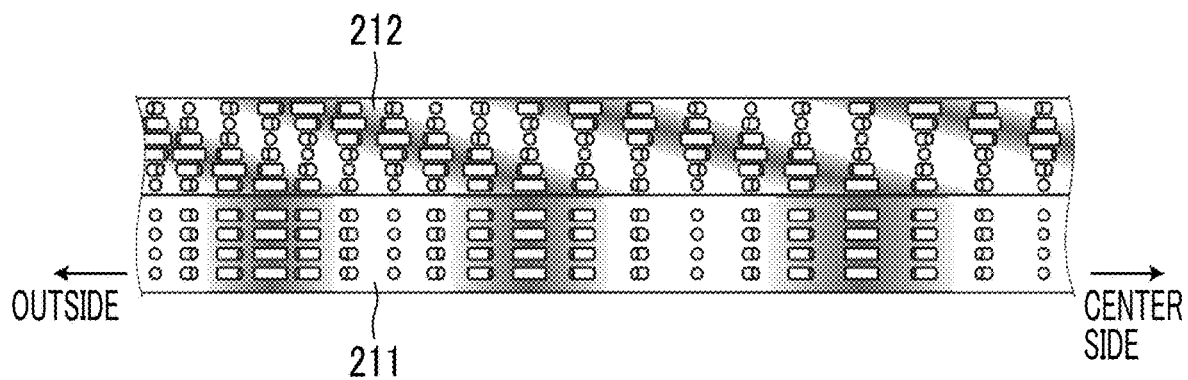
FIG. 13 is a view illustrating a layer configuration of an optical element of Example 2.

An optical element comprising two optically anisotropic layer in which the first optically anisotropic layer was the non-inclined optically anisotropic layer 211 and the second optically anisotropic layer was the inclined optically anisotropic layer 212 was prepared in Example 2 (see FIG. 13). That is, in Example 2, the optical element had a configuration in which the first optically anisotropic layer and the second optically anisotropic layer of Example 1 were reversed.

The optical element of Example 2 was prepared in the same manner as in Example 1 except that the first optically anisotropic layer was formed using the composition A-1 and the second optically anisotropic layer was formed using the composition A-2.

It was confirmed that the first optically anisotropic layer and the second optically anisotropic layer were formed such that "$\Delta n_{940} \times$thickness" of a liquid crystal was finally Re (940) of 470 nm and each had a concentric periodic alignment surface as illustrated in FIG. 8 using a polarizing microscope. In the horizontal rotational alignment pattern of the first optically anisotropic layer, one period was extremely large at the central portion (the reciprocal of the period can be regarded as 0), which was 9.0 μm at a distance of 1.0 mm from the center, 4.5 μm at a distance of 2.5 mm from the center, and 3.0 μm at a distance of 4.0 mm from the center, and the period shortened toward the outer direction. Further, the twist angle of the first optically anisotropic layer in the thickness direction was 0°. Further, the twist angle of the second optically anisotropic layer in the thickness direction was a right twist angle of 140°. Further, in the cross-sectional image obtained using an SEM, bright and dark lines extending in the normal direction of the lower interface (the interface between the optically anisotropic layer and the glass substrate) of the optically anisotropic layer were observed in the first optically anisotropic layer, and bright and dark lines obliquely inclined to the normal line were observed in the second optically anisotropic layer. In the second optically anisotropic layer, the inclination angle of the bright and dark lines with respect to the normal line was smaller from the center to the outside. In both the first optically anisotropic layer and the second optically anisotropic layer, a state where the period of the pattern of the bright and dark lines shortened from the center to the outside was observed.

Comparative Example 2

An optical element comprising the inclined optically anisotropic layer 212, in which bright and dark lines were inclined to the normal line of the interface in a cross-sectional SEM image, as the first optically anisotropic layer was prepared in Comparative Example 2.

(Formation of First Optically Anisotropic Layer)

The first optically anisotropic layer of Comparative Example 2 was the same as the first optically anisotropic layer of Example 1, and the first optically anisotropic layer was formed on the alignment film P-1 in the same manner as that for the first optically anisotropic layer of Example 1 using the composition A-2, thereby preparing an optical element of Comparative Example 2. That is, the optical element of Comparative Example 2 had a configuration in which only one inclined optically anisotropic layer was provided as the optically anisotropic layer.

It was confirmed that the first optically anisotropic layer was formed such that "$\Delta n_{940} \times$ thickness" of a liquid crystal was finally Re (940) of 470 nm and had a concentric periodic alignment surface as illustrated in FIG. 8 using a polarizing microscope. In the horizontal rotational alignment pattern of the first optically anisotropic layer, one period was extremely large at the central portion (the reciprocal of the period can be regarded as 0), which was 9.0 μm at a distance of 1.0 mm from the center, 4.5 μm at a distance of 2.5 mm from the center, and 3.0 μm at a distance of 4.0 mm from the center, and the period shortened toward the outer direction. Further, the twist angle of the first optically anisotropic layer in the thickness direction was a right twist angle of 140°. Further, in the cross-sectional image obtained using an SEM, bright and dark lines obliquely inclined to the normal line of the lower interface (the interface between the optically anisotropic layer and the glass substrate) of the optically anisotropic layer were observed in the first optically anisotropic layer. In the first optically anisotropic layer, the inclination angle of the bright and dark lines with respect to the normal line was smaller from the center to the outside. A state where the period of the pattern of the bright and dark lines shortened from the center to the outside was observed.

Example 3

Figure 14:
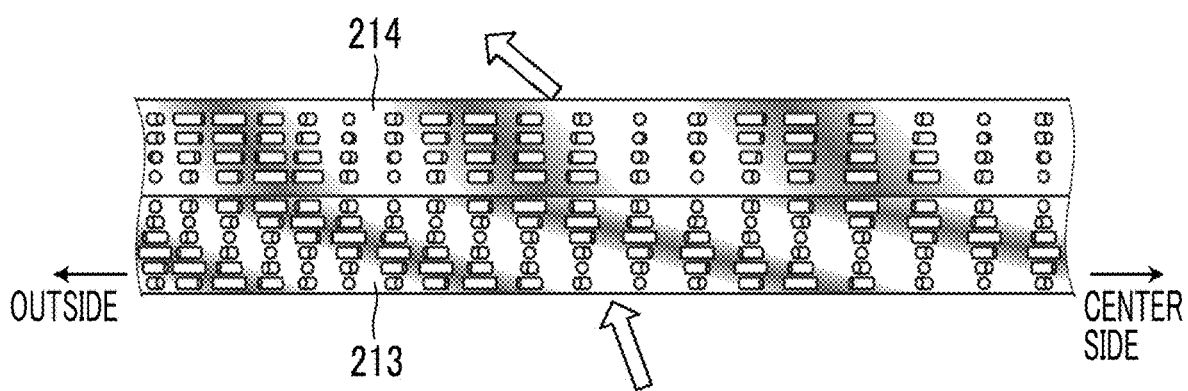
FIG. 14 is a view illustrating a layer configuration of an optical element of Example 3.

An optical element comprising two optically anisotropic layers in which the first optically anisotropic layer and the second optically anisotropic layer were inclined optically anisotropic layers 213 and 214 formed such that the bright and dark lines were inclined to the normal line of the interface in a cross-sectional SEM image was prepared in Example 3 (see FIG. 14). In the first optically anisotropic layer and the second optically anisotropic layer, the inclination directions of the bright and dark lines in the cross-sectional SEM image were set to be the same as each other, and the inclination angles were set to be different from each other.

(Formation of First Optically Anisotropic Layer)

The following composition A-3 was prepared as a liquid crystal composition for forming the first optically anisotropic layer.

Composition A-3
Liquid crystal compound L-1: 100.00 parts by mass
Chiral agent A: 0.24 parts by mass
Polymerization initiator (Irgacure (registered trademark) 907, manufactured by BASF SE): 3.00 parts by mass
Photosensitizer (KAYACURE DETX-S, manufactured by Nippon Kayaku Co., Ltd.): 1.00 parts by mass
Leveling agent T-1: 0.08 parts by mass
Methyl ethyl ketone: 2840.00 parts by mass The first optically anisotropic layer was formed on the alignment film P-1 in the same manner as in Example 1 except that the composition A-3 was used.

(Formation of Second Optically Anisotropic Layer)

The following composition A-4 was prepared as a liquid crystal composition for forming the optically anisotropic layer.

Composition A-4
Liquid crystal compound L-1: 100.00 parts by mass
Chiral agent A: 0.03 parts by mass
Polymerization initiator (Irgacure (registered trademark) 907, manufactured by BASF SE): 3.00 parts by mass
Photosensitizer (KAYACURE DETX-S, manufactured by Nippon Kayaku Co., Ltd.): 1.00 parts by mass
Leveling agent T-1: 0.08 parts by mass
Methyl ethyl ketone: 2840.00 parts by mass An optical element of Example 3 was prepared by forming the second optically anisotropic layer on the first optically anisotropic layer in the same manner as in Example 1 except that the composition A-4 was used.

It was confirmed that the first optically anisotropic layer and the second optically anisotropic layer were formed such that "$\Delta n_{940} \times$ thickness" of a liquid crystal was finally Re (940) of 470 nm and each had a concentric periodic alignment surface as illustrated in FIG. 8 using a polarizing microscope. In the horizontal rotational alignment pattern of the first optically anisotropic layer, one period was extremely large at the central portion (the reciprocal of the period can be regarded as 0), which was 9.0 μm at a distance of 1.0 mm from the center, 4.5 μm at a distance of 2.5 mm from the center, and 3.0 μm at a distance of 4.0 mm from the center, and the period shortened toward the outer direction. Further, the twist angle of the first optically anisotropic layer in the thickness direction was a right twist angle of 160°. The twist angle of the second optically anisotropic layer in the thickness direction was a right twist angle of 20°. The twist directions of the first optically anisotropic layer and the second optically anisotropic layer were the same as each other. Further, in both the first optically anisotropic layer and the second optically anisotropic layer in the cross-sectional image obtained by using an SEM, the bright and dark lines obliquely inclined to the normal line of the lower interface of the optically anisotropic layer were observed. Further, the inclination angle of the bright and dark lines with respect to the normal line was smaller from the center to the outside, and the inclination directions of the bright and dark lines of the first optically anisotropic layer and the second optically anisotropic layer from the normal line were the same as each other. In both the first optically anisotropic layer and the second optically anisotropic layer, a state where the period of the pattern of the bright and dark lines shortened from the center to the outside was observed.

Example 4

Figure 15:
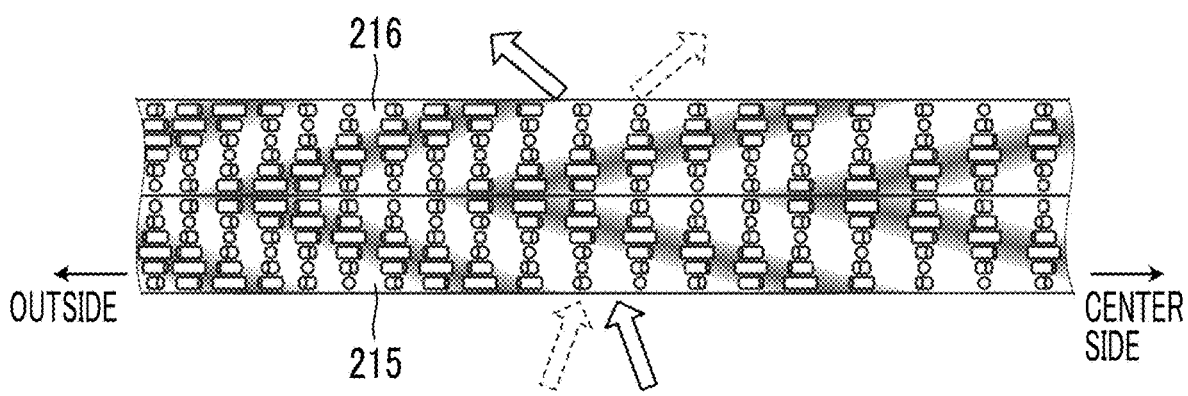
FIG. 15 is a view illustrating a layer configuration of an optical element of Example 4.

An optical element comprising two optically anisotropic layers in which the first optically anisotropic layer and the second optically anisotropic layer were inclined optically anisotropic layers 215 and 216 formed such that the bright and dark lines were inclined to the normal line of the interface in a cross-sectional SEM image was prepared in Example 4 (see FIG. 15). In the first optically anisotropic layer and the second optically anisotropic layer, the inclination directions the bright and dark lines in the cross-sectional SEM image were set to be different from each other.

(Formation of First Optically Anisotropic Layer)

The following composition A-5 was prepared as a liquid crystal composition for forming the optically anisotropic layer.

Composition A-5
Liquid crystal compound L-1: 100.00 parts by mass
Chiral agent A: 0.13 parts by mass
Polymerization initiator (Irgacure (registered trademark) 907, manufactured by BASF SE): 3.00 parts by mass
Photosensitizer (KAYACURE DETX-S, manufactured by Nippon Kayaku Co., Ltd.): 1.00 parts by mass Leveling agent T-1: 0.08 parts by mass
Methyl ethyl ketone: 2840.00 parts by mass The first optically anisotropic layer was formed on the alignment film P-1 in the same manner as in Example 1 except that the composition A-5 was used.

(Formation of Second Optically Anisotropic Layer)

The following composition A-6 was prepared as a liquid crystal composition for forming the optically anisotropic layer.

Composition A-6
Liquid crystal compound L-1: 100.00 parts by mass
Chiral agent B: 0.22 parts by mass
Polymerization initiator (Irgacure (registered trademark) 907, manufactured by BASF SE): 3.00 parts by mass
Photosensitizer (KAYACURE DETX-S, manufactured by Nippon Kayaku Co., Ltd.): 1.00 parts by mass
Leveling agent T-1: 0.08 parts by mass
Methyl ethyl ketone: 2840.00 parts by mass
Chiral agent B

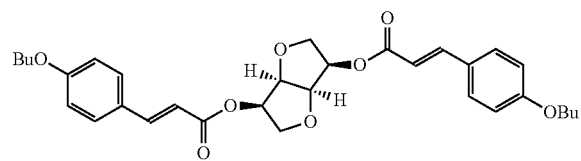

An optical element of Example 4 was prepared by forming the second optically anisotropic layer on the first optically anisotropic layer in the same manner as in Example 1 except that the composition A-6 was used.

It was confirmed that the first optically anisotropic layer and the second optically anisotropic layer were formed such that "$\Delta n_{940} \times$thickness" of a liquid crystal was finally Re (940) of 470 nm and each had a concentric periodic alignment surface as illustrated in FIG. 8 using a polarizing microscope. In the horizontal rotational alignment pattern of the first optically anisotropic layer, one period was extremely large at the central portion (the reciprocal of the period can be regarded as 0), which was 9.0 μm at a distance of 1.0 mm from the center, 4.5 μm at a distance of 2.5 mm from the center, and 3.0 μm at a distance of 4.0 mm from the center, and the period shortened toward the outer direction. Further, the twist angle of the first optically anisotropic layer in the thickness direction was a right twist angle of 80°. The twist angle of the second optically anisotropic layer in the thickness direction was a left twist angle of 80°. The twist directions of the first optically anisotropic layer and the second optically anisotropic layer were opposite to each other. Further, in both the first optically anisotropic layer and the second optically anisotropic layer in the cross-sectional image obtained by using an SEM, a state where the bright and dark lines obliquely inclined to the normal line of the lower interface of the optically anisotropic layer was observed. Further, the inclination angle of the bright and dark lines with respect to the normal line was smaller from the center to the outside, and the inclination directions of the bright and dark lines of the first optically anisotropic layer and the second optically anisotropic layer from the normal line were opposite to each other. In both the first optically anisotropic layer and the second optically anisotropic layer, a state where the period of the pattern of the bright and dark lines shortened from the center to the outside was observed.

Example 5

Figure 16:
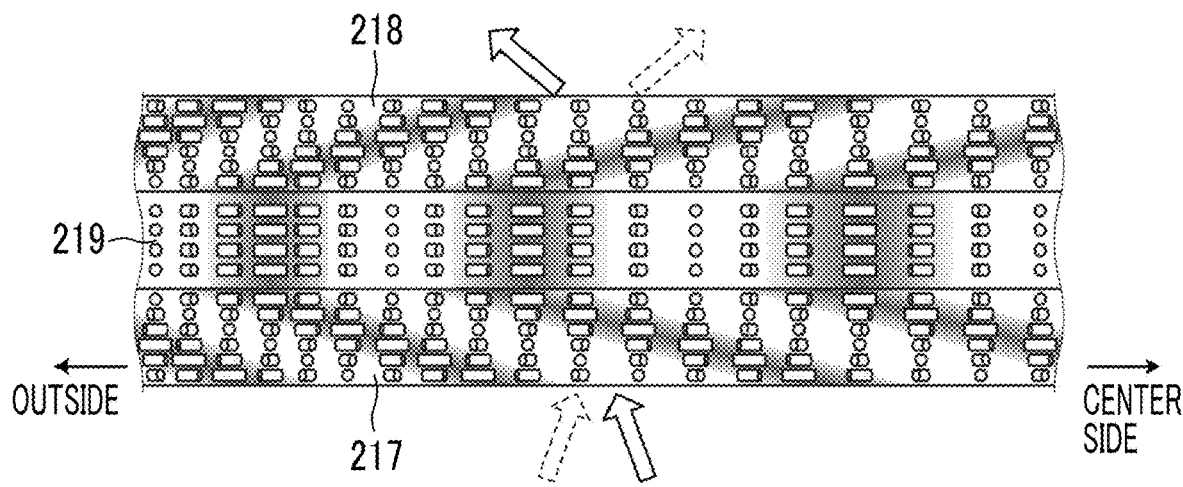
FIG. 16 is a view illustrating a layer configuration of an optical element of Example 5.

An optical element comprising three optically anisotropic layers in which the first optically anisotropic layer and the third optically anisotropic layer were inclined optically anisotropic layers 217 and 218 formed such that the bright and dark lines were inclined to the normal line of the interface in a cross-sectional SEM image and a second optically anisotropic layer disposed between the first and third optically anisotropic layers was a non-inclined optically anisotropic layer 219 was prepared in Example 5 (see FIG. 16). In the first optically anisotropic layer and the third optically anisotropic layer, the inclination directions the bright and dark lines in the cross-sectional SEM image were set to be different from each other.

(Formation of First Optically Anisotropic Layer)

The following composition A-7 was prepared as a liquid crystal composition for forming the optically anisotropic layer.

Composition A-7
Liquid crystal compound L-1: 100.00 parts by mass
Chiral agent A: 0.19 parts by mass
Polymerization initiator (Irgacure (registered trademark) 907, manufactured by BASF SE): 3.00 parts by mass
Photosensitizer (KAYACURE DETX-S, manufactured by Nippon Kayaku Co., Ltd.): 1.00 parts by mass
Leveling agent T-1: 0.08 parts by mass
Methyl ethyl ketone: 2840.00 parts by mass The first optically anisotropic layer was formed on the alignment film P-1 in the same manner as in Example 1 except that the composition A-7 was used.

(Formation of Second Optically Anisotropic Layer)

The second optically anisotropic layer was formed on the first optically anisotropic layer in the same manner as that for the first optically anisotropic layer of Comparative Example 1 except that the composition A-1 was used and the film thickness was changed.

(Formation of Third Optically Anisotropic Layer)

The following composition A-8 was prepared as a liquid crystal composition for forming the optically anisotropic layer.

Composition A-8
Liquid crystal compound L-1: 100.00 parts by mass
Chiral agent B: 0.32 parts by mass
Polymerization initiator (Irgacure (registered trademark) 907, manufactured by BASF SE): 3.00 parts by mass
Photosensitizer (KAYACURE DETX-S, manufactured by Nippon Kayaku Co., Ltd.): 1.00 parts by mass
Leveling agent T-1: 0.08 parts by mass
Methyl ethyl ketone: 2840.00 parts by mass An optical element of Example 5 was prepared by forming the third optically anisotropic layer on the second optically anisotropic layer in the same manner as in Example 1 except that the composition A-8 was used.

The first optically anisotropic layer and the third optically anisotropic layer were formed such that "$\Delta n_{940} \times$thickness" of a liquid crystal was finally Re (940) of 470 nm and the second optically anisotropic layer was formed such that "$\Delta n_{940} \times$thickness" was finally Re (940) of 564 nm. Further, it was confirmed that each layer had a concentric periodic alignment surface as illustrated in FIG. 8 using a polarizing microscope. In the horizontal rotational alignment pattern of the first optically anisotropic layer, one period was extremely large at the central portion (the reciprocal of the period can be regarded as 0), which was 9.0 μm at a distance of 1.0 mm from the center, 4.5 μm at a distance of 2.5 mm from the center, and 3.0 μm at a distance of 4.0 mm from the center, and the period shortened toward the outer direction. Further, the twist angle of the first optically anisotropic layer in the thickness direction was a right twist angle of 130°. The twist angle of the second optically anisotropic layer in the thickness direction was 0°, and the twist angle of the third optically anisotropic layer in the thickness direction was a left twist angle of 130°. The twist directions of the first optically anisotropic layer and the third optically anisotropic layer were opposite to each other. Further, in the cross-sectional image obtained by using an SEM, the bright and dark lines obliquely inclined to the normal line of the lower interface of the optically anisotropic layer were observed in the first optically anisotropic layer and the third optically anisotropic layer, and the bright and dark lines extending along the normal line were observed in the second optically anisotropic layer. The inclination angle of the bright and dark lines with respect to the normal line was smaller from the center to the outside in the first and third optically anisotropic layers, and the inclination directions of the bright and dark lines of the first optically anisotropic layer and the third optically anisotropic layer to the normal line were opposite to each other. In all the first optically anisotropic layer, the second optically anisotropic layer, and the third optically anisotropic layer, a state where the period of the pattern of the bright and dark lines shortened from the center to the outside was observed.

[Evaluation]

The optical elements of Comparative Example 1 and Examples 1 to 5 function as transmission type diffraction elements. For each optical element, the angle of transmitted diffracted light with respect to the normal direction of the optical element in a case of allowing light to be incident was measured, and the rate of increase in light intensity with respect to the element of Comparative Example 1 was evaluated. The specific measuring method is as described below.

First, laser light was allowed to be incident on a predetermined position of the surface of the optical element at a predetermined incidence angle, the transmitted light was projected onto a screen disposed at a distance of 30 cm in the normal direction of the optical element, and the angle of the transmitted diffracted light from the image captured by an infrared camera was calculated. A laser diode having a wavelength of 940 nm was used as a light source.

Figure 17:
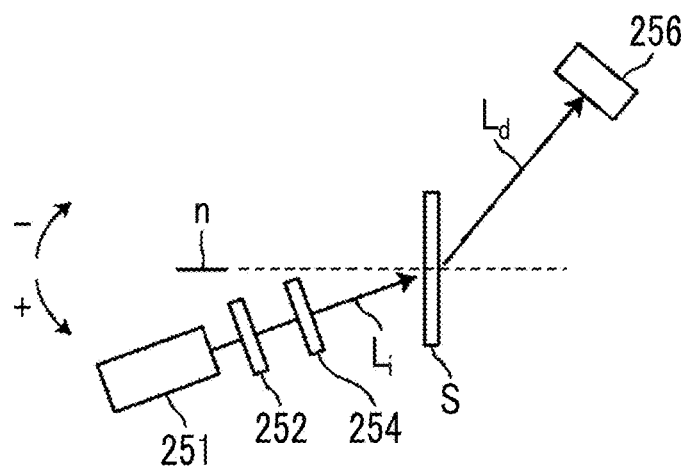
FIG. 17 is a conceptual view illustrating a method of measuring the intensity of transmitted light.

Next, as illustrated in FIG. 17, laser light having a wavelength of 940 nm which was emitted from a laser light source 251 was allowed to be transmitted through a linear polarizer 252 and a λ/4 plate 254 to obtain right circularly polarized light Li. The light Li was allowed to be incident on a predetermined position of a surface of an optical element S at a predetermined incidence angle. The light intensity of transmitted diffracted light Ld diffracted by the optical element S was measured by a photodetector 256. Further, the relative light intensity value of the diffracted light Ld with respect to the incidence ray was acquired by calculating the ratio between the light intensity of the diffracted light Ld and the light intensity of the light Li. Further, the incidence angle was changed and the relative light intensity value was acquired in the same manner as described above. The rate of increase in light intensity of each example with respect to Comparative Example 1 as the average value of the relative light intensity values with respect to different incidence angles was evaluated based on the following evaluation standards.

A: The rate of increase in light intensity was 20% or greater

B: The rate of increase in light intensity was 10% or greater and less than 20%

C: The rate of increase in light intensity was 5% or greater and less than 10%

D: The rate of increase in light intensity was less than 5%

In the comparison between Comparative Examples 1 and 2 and Examples 1 to 3, the evaluation was performed by setting the incidence angle at a distance of 1.0 mm from the center (1 period of 9.0 μm) to 10°, the incidence angle at a distance of 2.5 mm from the center (1 period of 4.5 μm) to 20°, and the incidence angle at a distance of 4.0 mm from the center (1 period of 3.0 μm) to 30°.

Further, in the comparison between Comparative Examples 1 and 2 and Examples 4 and 5, the evaluation was performed by setting the incidence angle at a distance of 1.0 mm from the center (1 period of 9.0 μm) to +10°, the incidence angle at a distance of 2.5 mm from the center (1 period of 4.5 μm) to +20°, and the incidence angle at a distance of 4.0 mm from the center (1 period of 3.0 μm) to +30°.

The results are listed in Table 1.

TABLE 1

| | | Comparative Example 1 | Comparative Example 2 | Example 1 | Example 2 | Example 3 | Example 4 | Example 5 |
|---|---|---|---|---|---|---|---|---|
| First optically anisotropic layer | Δnd [nm] | 470 | 470 | 470 | 470 | 470 | 423 | 470 |
| | Twist angle [°] | 0 | Right twist angle of 140 | Right twist angle of 140 | 0 | Right twist angle of 160 | Right twist angle of 80 | Right twist angle of 130 |
| Second optically anisotropic layer | Δnd [nm] | — | — | 470 | 470 | 470 | 423 | 564 |
| | Twist angle [°] | — | — | 0 | Right twist angle of 140 | Right twist angle of 20 | Left twist angle of 80 | 0 |
| Third optically anisotropic layer | Δnd [nm] | — | — | — | — | — | — | 470 |
| | Twist angle [°] | — | — | — | — | — | — | Left twist angle of 130 |
| Evaluation | | Reference | D | A | A | A | A | A |

The higher average diffraction efficiency was obtained in an incidence angle range of 10° to 30° in Examples 1 to 3 and in an incidence angle range of −30° to +30° in Examples 4 and 5, as compared to Comparative Example 1. The diffraction efficiency was able to be increased over a wider incidence angle range by combining inclined optically anisotropic layers in which the inclinations of the bright and dark lines in the cross-sectional SEM image were opposite to each other. Further, in the optical element of Comparative Example 2 which comprised only one inclined optically anisotropic layer, the effect of increasing the average diffraction efficiency was not able to be obtained.

Comparative Example 11

Figure 18:
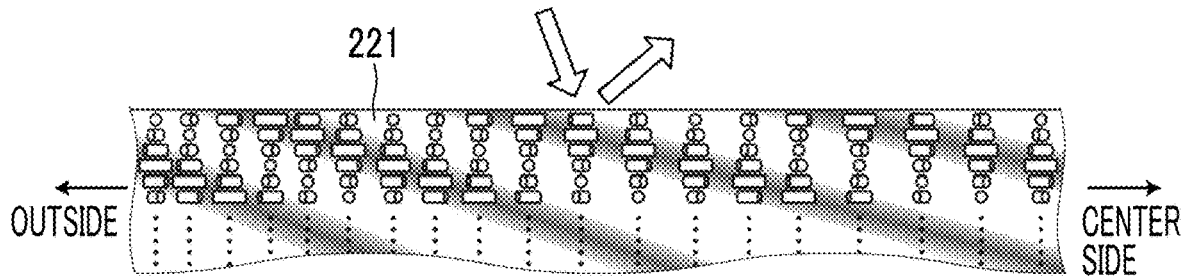
FIG. 18 is a view illustrating a layer configuration of an optical element of Comparative Example 11.

An optical element having a horizontal rotational alignment pattern in which the period gradually changed and comprising a first optically anisotropic layer 221 cholesterically aligned in the thickness direction was prepared in Comparative Example 11 (see FIG. 18). FIG. 18 schematically illustrates a part of the cholesteric alignment in the thickness direction.

(Formation of First Optically Anisotropic Layer) The following composition C-1 was prepared as a liquid crystal composition for forming the optically anisotropic layer. The composition C-1 is a liquid crystal composition in which the selective reflection center wavelength is 940 nm and a cholesteric liquid crystal layer that reflects right circularly polarized light is formed.

Composition C-1
Liquid crystal compound L-1: 100.00 parts by mass
Chiral agent A: 3.11 parts by mass
Polymerization initiator (Irgacure (registered trademark) 907, manufactured by BASF SE): 3.00 parts by mass
Photosensitizer (KAYACURE DETX-S, manufactured by Nippon Kayaku Co., Ltd.): 1.00 parts by mass
Leveling agent T-1: 0.08 parts by mass
Methyl ethyl ketone: 2840.00 parts by mass An optical element of Comparative Example 11 was prepared by forming the first optically anisotropic layer on the alignment film P-1 in the same manner as in Example 1 except that the composition C-1 was used and the film thickness was changed.

In a case where the cross section of the coating layer was confirmed using a scanning electron microscope, it was confirmed that the first optically anisotropic layer had 8 pitches of a cholesteric liquid crystalline phase and had a concentric periodic alignment surface as illustrated in FIG. 8 using a polarizing microscope. In the horizontal rotational alignment pattern of the first optically anisotropic layer, one period was extremely large at the central portion (the reciprocal of the period can be regarded as 0), which was 9.0 µm at a distance of 1.0 mm from the center, 4.5 µm at a distance of 2.5 mm from the center, and 3.0 µm at a distance of 4.0 mm from the center, and the period shortened toward the outer direction. Further, in the cross-sectional image obtained by using an SEM, the bright and dark lines of the first optically anisotropic layer were obliquely inclined to the normal line of the lower interface of the optically anisotropic layer. In the first optically anisotropic layer, the inclination angle of the bright and dark lines widened from the center to the outside. A state where the period of the pattern of the bright and dark lines of the first optically anisotropic layer shortened from the center to the outside was observed.

Example 11

Figure 19:
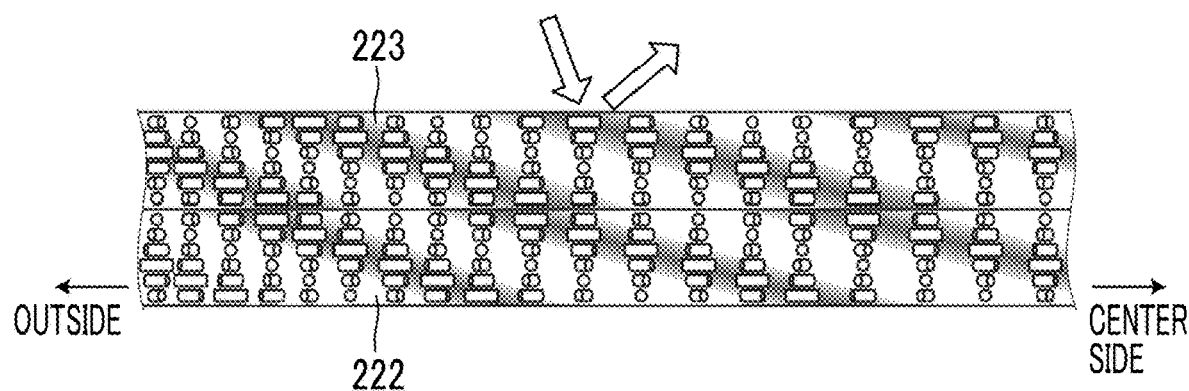
FIG. 19 is a view illustrating a layer configuration of an optical element of Example 11.

An optical element comprising a first optically anisotropic layer 222 and a second optically anisotropic layer 223 which were cholesterically aligned in the thickness direction and each had a horizontal rotational alignment pattern in which the period gradually changed was prepared in Example 11 (see FIG. 19). FIG. 19 schematically illustrates a part of the cholesteric alignment in the thickness direction.

(Formation of First Optically Anisotropic Layer)
The first optically anisotropic layer was formed on the alignment film P-1 in the same manner as in Comparative Example 11 using the composition C-1.

In a case where the cross section of the coating layer was confirmed using a scanning electron microscope, it was confirmed that the first optically anisotropic layer had 8 pitches of a cholesteric liquid crystalline phase and had a concentric (radial) periodic alignment surface as illustrated in FIG. 8 using a polarizing microscope. In the horizontal rotational alignment pattern of the first optically anisotropic layer, one period was extremely large at the central portion (the reciprocal of the period can be regarded as 0), which was 9.0 µm at a distance of 1.0 mm from the center, 4.5 µm at a distance of 2.5 mm from the center, and 3.0 µm at a distance of 4.0 mm from the center, and the period shortened toward the outer direction.

(Formation of Second Optically Anisotropic Layer)
The following composition C-2 was prepared as a liquid crystal composition for forming the second optically anisotropic layer. The composition C-2 is a liquid crystal composition in which the selective reflection center wavelength is 940 nm and a cholesteric liquid crystal layer that reflects left circularly polarized light is formed.

<Composition C-2>
Liquid crystal compound L-1: 100.00 parts by mass
Chiral agent B: 4.42 parts by mass
Polymerization initiator (Irgacure (registered trademark) 907, manufactured by BASF SE): 3.00 parts by mass
Photosensitizer (KAYACURE DETX-S, manufactured by Nippon Kayaku Co., Ltd.): 1.00 parts by mass
Leveling agent T-1: 0.08 parts by mass
Methyl ethyl ketone: 2840.00 parts by mass The second optically anisotropic layer was formed on the alignment film P-1 in the same manner as in Comparative Example 11.

In a case where the cross section of the coating layer was confirmed using a scanning electron microscope, it was confirmed that the first optically anisotropic layer had 8 pitches of a cholesteric liquid crystalline phase and had a concentric periodic alignment surface as illustrated in FIG. 8 using a polarizing microscope. In the horizontal rotational alignment pattern of the first optically anisotropic layer, one period was extremely large at the central portion (the reciprocal of the period can be regarded as 0), which was 9.0 µm at a distance of 1.0 mm from the center, 4.5 µm at a distance of 2.5 mm from the center, and 3.0 µm at a distance of 4.0 mm from the center, and the period shortened toward the outer direction.

An optical element of Example 11 was prepared by bonding the first optically anisotropic layer and the second optically anisotropic layer to each other. Further, in a case where the first optically anisotropic layer and the second optically anisotropic layer were laminated, the layers were bonded to each other such that the continuous rotation directions of the orientations of the optical axes in the liquid crystal alignment patterns were different from each other.

In both the first optically anisotropic layer and the second optically anisotropic layer in the cross-sectional image obtained by using an SEM, a state where the bright and dark lines obliquely inclined to the normal line of the lower interface of the optically anisotropic layer was observed. Further, the inclination angle of the bright and dark lines was smaller from the center to the outside, and the inclination directions of the bright and dark lines of the first optically anisotropic layer and the second optically anisotropic layer to the normal line were the same as each other. In both the first optically anisotropic layer and the second optically anisotropic layer, a state where the period of the pattern of the bright and dark lines shortened from the center to the outside was observed.

[Evaluation]

The optical elements of Comparative Example 11 and Example 11 function as reflection type diffraction elements. For each optical element, the angle of reflected diffracted light with respect to the normal direction of the optical element in a case of allowing light to be incident was measured, and the rate of increase in light intensity was evaluated. The specific measuring method is as described below.

Laser light was allowed to be incident on a predetermined position of the surface of the optical element at a predetermined incidence angle, the reflected light was projected onto a screen disposed at a distance of 30 cm in the normal direction of the optical element, and the angle of the reflected diffracted light from the image captured by an infrared camera was calculated. A laser diode having a wavelength of 940 nm was used as a light source.

Figure 20:
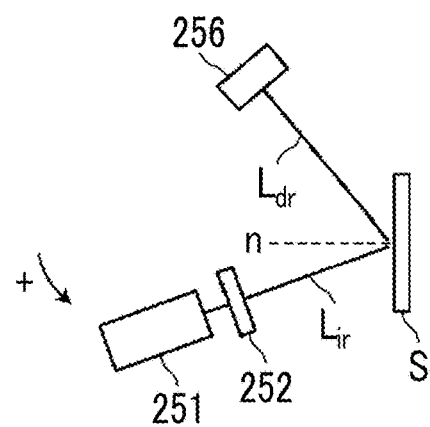
FIG. 20 is a conceptual view illustrating a method of measuring the intensity of reflected light.

Next, as illustrated in FIG. 20, laser light having a wavelength of 940 nm which was emitted from the laser light source 251 was allowed to be transmitted through the linear polarizer 252 to obtain linearly polarized light Lir. The light Lir was allowed to be incident on a predetermined position of the surface of the optical element S at a predetermined incidence angle.

The light intensity of reflected diffracted light Ldr diffracted by the optical element S was measured by the photodetector 256. Further, the relative light intensity value of the diffracted light Ldr with respect to the incidence ray was acquired by calculating the ratio between the light intensity of the diffracted light Ldr and the light intensity of the light Lir. Further, the incidence angle was changed and the relative light intensity value was acquired in the same manner as described above. The rate of increase in light intensity of the example with respect to the comparative example as the average value of the relative light intensity values with respect to different incidence angles was evaluated based on the following evaluation standards.

A: The rate of increase in light intensity was 20% or greater B: The rate of increase in light intensity was 10% or greater and less than 20% C: The rate of increase in light intensity was 5% or greater and less than 10% D: The rate of increase in light intensity was less than 5%

In the comparison between Comparative Example 11 and Example 11, the evaluation was performed by setting the incidence angle at a distance of 1.0 mm from the center (1 period of 9.0 μm) to 10°, the incidence angle at a distance of 2.5 mm from the center (1 period of 4.5 μm) to 20°, and the incidence angle at a distance of 4.0 mm from the center (1 period of 3.0 μm) to 30°.

The results are listed in Table 2.

TABLE 2

|  |  | Comparative Example 11 | Example 11 |
|---|---|---|---|
| First optically anisotropic layer | Twist direction | Right | Right |
|  | Reflection center wavelength [nm] | 940 | 940 |
| Second optically anisotropic layer | Twist direction | — | Left |
|  | Reflection center wavelength [nm] | — | 940 |
|  | Evaluation | Reference | A |

The higher average diffraction efficiency was obtained in an incidence angle range of 10° to 30° in Example 11 as compared to Comparative Example 11.

The disclosure of JP2018-185584 filed on Sep. 28, 2018 is incorporated herein by reference in its entirety.

All documents, patent applications, and technical standards described in the present specification are incorporated herein as cited documents in the same degree as a case where the documents, patent applications, and technical standards are specified specifically and individually to be incorporated as cited documents.

What is claimed is:

1. An optical element comprising:
a plurality of optically anisotropic layers, each of which has an in-plane alignment pattern in which orientations of optical axes derived from a liquid crystal compound change continuously and rotationally along at least one in-plane direction, in a thickness direction,
wherein the optically anisotropic layers each have regions where lengths over which the orientations of the optical axes rotate by 180° in the at least one in-plane direction are different from each other,
wherein at least one of the plurality of optically anisotropic layers is an inclined optically anisotropic layer having a region where a plurality of pairs of bright lines and dark lines derived from the orientations of the optical axes in a cross-sectional image obtained by observing a cross section cut in the thickness direction along the at least one in-plane direction using a scanning electron microscope are present and the pairs of the bright lines and the dark lines are inclined at inclination angles which are different from each other with respect to a normal line of an interface of the optically anisotropic layer,
wherein the plurality of optically anisotropic layers are laminated so as to coincide with each other in regions where the lengths over which the orientations of the optical axes rotate by 180° in the at least one in-plane direction coincide with each other, and
wherein an optically anisotropic layer adjacent to the inclined optically anisotropic layer has a plurality of pairs of bright lines and dark lines derived from the orientations of the optical axis in the cross-sectional image, and bright lines and dark lines are connected to each other at the interface with the inclined optically anisotropic layer.

2. The optical element according to claim 1,
wherein the optical element comprises two inclined optically anisotropic layers, and
wherein an inclination angle of the pairs of the bright lines and the dark lines in one inclined optically anisotropic layer is different from an inclination angle of the pairs of the bright lines and the dark lines of the other inclined optically anisotropic layer in at least some opposing regions of the two inclined optically anisotropic layers in the cross-sectional image.

3. The optical element according to claim 1,
wherein the optical element comprises two inclined optically anisotropic layers, and
wherein an inclination direction of the pairs of the bright lines and the dark lines in one inclined optically anisotropic layer with respect to the normal line is different from an inclination direction of the pairs of the bright lines and the dark lines of the other inclined optically anisotropic layer with respect to the normal line in at least some opposing regions of the two inclined optically anisotropic layers in the cross-sectional image.

4. The optical element according to claim 1,
wherein the optical element comprises two inclined optically anisotropic layers, and wherein an inclination direction of the pairs of the bright lines and the dark lines in one inclined optically anisotropic layer with respect to the normal line is the same as an inclination direction of the pairs of the bright lines and the dark lines of the other inclined optically anisotropic layer with respect to the normal line in at least some opposing regions of the two inclined optically anisotropic layers in the cross-sectional image.

5. The optical element according to claim 1, wherein the inclined optically anisotropic layer has a region where the optical axes are twistedly aligned in the thickness direction.

6. The optical element according to claim 1, wherein the optical element has a function of diffracting and transmitting an incidence ray.

7. The optical element according to claim 1, wherein the liquid crystal compound of the inclined optically anisotropic layers is cholesterically aligned.

8. The optical element according to claim 7, wherein the optical element has a function of diffracting and reflecting an incidence ray.

9. The optical element according to claim 1, wherein the in-plane alignment pattern of each optically anisotropic layer is a pattern in which the lengths over which the orientations of the optical axes rotate by 180° in the at least one in-plane direction gradually change in the at least one in-plane direction.

10. The optical element according to claim 1, wherein the in-plane alignment pattern of each optically anisotropic layer is a pattern in which the at least one in-plane direction is provided radially from an inner side to an outer side.

11. The optical element according to claim 1, wherein the in-plane alignment pattern of each optically anisotropic layer has a region where the length over which the orientations of the optical axes rotate by 180° in the at least one in-plane direction is 10 m or less.

12. A light deflection device comprising:
a light deflection element which deflects an incidence ray and emits the deflected incidence ray;
a driving unit which drives the light deflection element; and
the optical element according to claim 1, which is disposed on a light emission side of the light deflection element.

13. The optical element according to claim 1, wherein the regions where lengths over which the orientations of the optical axes rotate by 180° in the at least one in-plane direction are different from each other, are arranged in a manner wherein the lengths gradually change in the at least one in plane direction.

* * * * *